US012662215B2

(12) United States Patent
Langaas et al.

(10) Patent No.: US 12,662,215 B2
(45) Date of Patent: Jun. 23, 2026

(54) BUMPER MOUNT FOR SNOWMOBILE

(71) Applicant: Arctic Cat Inc., Thief River Falls, MN (US)

(72) Inventors: Benjamin Langaas, Thief River Falls, MN (US); David Vigen, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 718 days.

(21) Appl. No.: 17/983,968

(22) Filed: Nov. 9, 2022

(65) Prior Publication Data
US 2023/0257065 A1      Aug. 17, 2023

Related U.S. Application Data

(60) Provisional application No. 63/404,171, filed on Sep. 6, 2022, provisional application No. 63/404,167, filed on Sep. 6, 2022, provisional application No. 63/344,165, filed on May 20, 2022, provisional application No. 63/310,232, filed on Feb. 15, 2022.

(51) Int. Cl.
| | |
|---|---|
| *B62M 27/02* | (2006.01) |
| *B62J 6/022* | (2020.01) |
| *B62J 40/10* | (2020.01) |
| *F02M 35/10* | (2006.01) |
| *F02M 35/16* | (2006.01) |

(52) U.S. Cl.
CPC .............. *B62M 27/02* (2013.01); *B62J 6/022* (2020.02); *B62J 40/10* (2020.02); *F02M 35/10255* (2013.01); *F02M 35/10308* (2013.01); *F02M 35/162* (2013.01); *B62M 2027/028* (2013.01)

(58) Field of Classification Search
CPC .. B62M 27/02; B62M 2027/028; B62J 17/02; B62J 17/10; B62J 40/10
USPC ............. 180/190; 296/102, 106, 35.3, 203.2, 296/187.01
See application file for complete search history.

(56) References Cited

U.S. PATENT DOCUMENTS

| | | | |
|---|---|---|---|
| 3,688,856 A | 9/1972 | Boehm et al. | |
| 3,791,482 A | 2/1974 | Sykora | |
| 5,944,133 A * | 8/1999 | Eto ........................ | B62M 27/02 180/312 |
| 6,799,872 B2 | 10/2004 | Kawai | |
| 6,945,593 B2 | 9/2005 | Andre et al. | |

(Continued)

FOREIGN PATENT DOCUMENTS

WO          2019123432 A1      6/2019

OTHER PUBLICATIONS

Wiktionary "Channel" accessed Nov. 25, 2025, at "https://en.wiktionary.org/wiki/channel" (Year: 2025).*

(Continued)

*Primary Examiner* — Valentin Neacsu
*Assistant Examiner* — Tyler Jay Stanley
(74) *Attorney, Agent, or Firm* — Billion & Armitage

(57) ABSTRACT

An assembly for a snowmobile includes an airbox having a plenum for coupling to a throttle body of an engine and two branches defining openings for air intake. A storage box is mounted between the two branches and defines area for receiving a console. The airbox is part of a hood of the vehicle and includes an opening over a storage box. The disclosure also includes a ribbed bumper mount with a latch assembly for securing the hood.

27 Claims, 26 Drawing Sheets

(56) References Cited

U.S. PATENT DOCUMENTS

| | | | | |
|---|---|---|---|---|
| 7,007,998 | B2 | 3/2006 | Toyofuku | |
| 7,073,928 | B2 | 7/2006 | Toyofuku | |
| 7,121,370 | B2* | 10/2006 | Bedard | B62M 27/02 |
| | | | | 180/184 |
| 7,204,355 | B2 | 4/2007 | Akiyama et al. | |
| 7,357,207 | B2 | 4/2008 | Vaisanen | |
| 7,367,701 | B2 | 5/2008 | Lee | |
| D575,194 | S | 8/2008 | Hishiki | |
| 7,484,584 | B1 | 2/2009 | Kerner et al. | |
| D588,719 | S | 3/2009 | Longpre et al. | |
| 7,533,749 | B1 | 5/2009 | Sampson et al. | |
| 7,731,263 | B2 | 6/2010 | Tanaka | |
| 7,762,367 | B2 | 7/2010 | Yamaguchi et al. | |
| 7,766,360 | B2 | 8/2010 | Saitou et al. | |
| 7,802,644 | B2 | 9/2010 | Brodeur et al. | |
| 7,815,353 | B2 | 10/2010 | Aoki | |
| 7,870,920 | B1 | 1/2011 | Dahlgren et al. | |
| 7,985,271 | B2 | 7/2011 | Nobuhira | |
| 8,044,532 | B2 | 10/2011 | Miyamoto | |
| 8,127,877 | B2 | 3/2012 | Fredrickson et al. | |
| 8,260,504 | B2 | 9/2012 | Tsujii et al. | |
| 8,453,779 | B2 | 6/2013 | Vezina | |
| 8,651,221 | B2 | 2/2014 | Yagi et al. | |
| 8,912,722 | B2 | 12/2014 | Ooba et al. | |
| 8,937,431 | B2 | 1/2015 | Ooba et al. | |
| 8,987,991 | B2 | 3/2015 | Ikeda et al. | |
| 9,387,907 | B2 | 7/2016 | Nasca et al. | |
| 9,545,844 | B2 | 1/2017 | Forty et al. | |
| 9,809,195 | B2 | 11/2017 | Giese et al. | |
| 9,845,004 | B2 | 12/2017 | Hedlund et al. | |
| D808,067 | S | 1/2018 | Rius et al. | |
| 10,195,999 | B1 | 2/2019 | Glickman et al. | |
| 10,358,187 | B2 | 7/2019 | Vistad et al. | |
| D860,488 | S | 9/2019 | Cote et al. | |
| D872,354 | S | 1/2020 | Cote et al. | |
| 10,543,792 | B2 | 1/2020 | Yoshioka et al. | |
| 10,800,458 | B2 | 10/2020 | Makowski et al. | |
| D912,283 | S | 3/2021 | Fisher | |
| 11,130,439 | B2 | 9/2021 | Ben Attouch | |
| 12,188,439 | B2 | 1/2025 | Lemieux et al. | |
| 2002/0100651 | A1* | 8/2002 | Akiyama | F16F 7/121 |
| | | | | 188/371 |
| 2006/0175106 | A1* | 8/2006 | Vaisanen | B62M 27/00 |
| | | | | 180/190 |
| 2009/0160204 | A1* | 6/2009 | Czopek | B60R 19/18 |
| | | | | 293/133 |
| 2009/0255745 | A1 | 10/2009 | Kukowski et al. | |
| 2015/0291114 | A1* | 10/2015 | Borde | B60R 19/24 |
| | | | | 293/133 |
| 2019/0196447 | A1* | 6/2019 | Kreig | F16B 11/006 |
| 2020/0148056 | A1 | 5/2020 | Forty et al. | |
| 2021/0039558 | A1 | 2/2021 | Rucker et al. | |
| 2021/0086840 | A1 | 3/2021 | Glickman et al. | |
| 2021/0114525 | A1 | 4/2021 | Mazzarella | |
| 2021/0188157 | A1 | 6/2021 | Ben Attouch | |
| 2021/0188182 | A1 | 6/2021 | Edwards et al. | |
| 2021/0213899 | A1 | 7/2021 | Yotsuyanagi et al. | |
| 2021/0237652 | A1 | 8/2021 | Mazzarella | |
| 2021/0347432 | A1 | 11/2021 | Halvorson | |
| 2022/0009419 | A1 | 1/2022 | Kim et al. | |
| 2022/0219784 | A1* | 7/2022 | Bruneau | B60K 1/04 |
| 2024/0400157 | A1 | 12/2024 | Vezina et al. | |

OTHER PUBLICATIONS

Denis Lavoie, REV Gen5—Ski-Doo new mountain snowmobile platform, 21 pages, https://sledmagazine.com/rev-gen5-ski-doo-new-mountain-snowmobile-platform/.

Glove box extension and USB port, Ski-Doo Snowmobiles Forum, 4 pages, https://www.dootalk.com/threads/glove-box-extension-and-usb-port.1567995/.

Glovebox for One-Piece Lightweight Hood-Snowmobile Parts & Accessories—Ski-Doo, 2 pages, https://shop.ski-doo.com/us/en/860202193-glovebox-for-one-piece-lightweight-hood.html.

One-Piece G4 Lightweight Hood, 3 pages, https://www.brppac.com/brp-860202087.html.

Skinz Flat Black Helium Lightweight Hood Kit—SDHK450-BK—Dennis Kirk, 4 pages, https://www.denniskirk.com/skinz/flat-black-helium-lightweight-hood-kit-sdhk450-bk.p398692.prd/398692.sku.

Front Bumper—Arctic Cat Mountain Cat 1M| Alberta Motorsports Sales & Salvage Ltd, 3 pages, https://abmotorsports.ca/products/front-bumper-1606-949.

Airbox with Integrated Storage and Air Intakes, Infringement and Patentability Search, Apr. 7, 2022, 13 pages, Kramer IP Search, Alexandria, VA.

Composite Front Bumper Mount for Snowmobile, Infringement and Patentability Search, May 6, 2022, 10 pages, Kramer IP Search, Alexandria, VA.

* cited by examiner

BUMPER MOUNT FOR SNOWMOBILE

PRIORITY CLAIM

This application claims the benefit of U.S. Provisional Application Ser. No. 63/404,171 filed Sep. 6, 2022 and entitled BUMPER MOUNT FOR A SNOWMOBILE, U.S. Provisional Application Ser. No. 63/404,167 filed Sep. 6, 2022 and entitled INTAKE, AIRBOX, AND STORAGE ASSEMBLY FOR SNOWMOBILE, U.S. Provisional Application Ser. No. 63/344,165 filed May 20, 2022 and entitled FRAME ASSEMBLY, and U.S. Provisional Application Ser. No. 63/310,232 filed Feb. 15, 2022 and entitled HEADLIGHT.

FIELD OF THE DISCLOSURE

This application relates to snowmobiles and, more particularly, to hood assemblies, air intake structures, bumpers, and latch assemblies in the forward portion of a snowmobile.

BACKGROUND OF THE DISCLOSURE

Powersports vehicles are well-known, including different vehicles for different activities, such as personal watercraft, motorcycles, snowmobile, all-terrain vehicles (ATVs), and the like. Apart from use in competitive sports and recreation, some vehicles such as snowmobiles are also used for simple transportation over snow and ice. Snowmobiles are also used in deep snow, cross country racing, high performance luxury touring, trail riding, mountain riding, and the like. Snowmobiles are preferably durable and light for performance and longevity. Thus, all aspects of the snowmobile construction contribute including the front body, hood, and under-hood portions surrounding the engine. Such portions may include the bumper and bumper mount, the air intake and air plenum, and storage compartments. All of these should be compact, lightweight, and/or robust. Access to the under-hood components should also be convenient.

Use of bumpers on vehicles is well-known. In some cases, the bumper may be used for being towed or towing a disabled vehicle, as a grab point for moving a vehicle, whether stuck or otherwise, and for other purposes. The bumpers are attached either to front, rear, or to either side of vehicles. In some cases, a bumper is mounted on the frame of the vehicle directly. In other cases, the bumper is mounted on the frame of the vehicle using a provision that is attached to the frame of the vehicle. Such provision is known as a bumper mount.

The front of the vehicle might include air intake assemblies to feed air to an engine or for motor or transmission cooling. Air box assemblies generally serve at least two purposes. First, the air box assembly provides an air intake to the throttle body assembly of the engine. Typically, the air box assembly channels and screens incoming air from an air source as part of providing air intake to the throttle body assembly. Second, the air box assembly provides air-silencing capabilities by damping throttle noise produced by the throttle body assembly that travels back to the air box assembly.

It would be an advancement in the art to provide one or more of an improved bumper, hood, air intake, and airbox that may cooperate effectively with each other for use with a lightweight, durable snowmobile.

SUMMARY

A hood assembly for a snowmobile includes an airbox having a plenum defining an outlet for coupling to a throttle body of an engine. The airbox includes a first branch defining one or more first openings in fluid communication with the plenum and a second branch defining one or more second openings in fluid communication with the plenum. The assembly further includes a structural member connected to the first branch and the second branch, the structural member, first branch, second branch, and plenum defining a ring encircling an area. The structural member may include a storage box defining an internal volume.

A console is mounted to the airbox within the area. An outlet is mounted to the storage box and is accessible through the internal volume. A hood is secured to the airbox and define an opening such that the opening is positioned over the storage box. A lid is secured to the hood over the opening. The hood includes a first notch, and the storage box includes a second notch, the outlet being captured within the first notch and the second notch.

The airbox includes an upper airbox shell and a lower airbox shell. The upper airbox shell includes an upper plenum shell and a first upper branch and a second lower branch. The lower airbox shell includes a lower plenum shell and a first lower branch and a second lower branch.

One or more baffles may extend between the upper airbox shell and the lower airbox shell and define an indirect path between the one or more first openings and the outlet and the one or more second openings and the outlet. A quarter wave chamber may also be positioned within the plenum. The one or more baffles may be formed in the lower airbox shell, and the quarter wave chamber may be positioned between the one or more baffles and the upper airbox shell. One or more blocks of foam may be positioned within the airbox.

The airbox may define one or more feet for positioning on a frame member of the snowmobile. The one or more feet each define a notch for receiving the frame member.

The assembly includes a first body panel mounted to the snowmobile below the first branch and a second body panel mounted to the snowmobile below the second branch. The first branch may include a first outward facing surface, the one or more first openings being defined by the first outward facing surface. The second branch may include a second outward facing surface, the one or more second openings may be defined by the second outward facing surface. The first body panel and first outward facing surface both conform to a first smooth shape; and the second body panel and second outward facing surface both conform to a second smooth shape.

The assembly includes a hood mounted above the airbox or even forming part of the airbox. The first branch may include a first outward facing surface, the one or more first openings including one or more first outer openings defined by the first outward facing surface. The second branch may include a second outward facing surface, the one or more second openings including one or more second outer openings defined by the second outward facing surface. A first surface of the hood and first outward facing surface may both conform to a first smooth shape. A second surface of the hood and the second outward facing surface may both conform to a second smooth shape.

One or more first hooks may be secured to the storage box and one or more second hooks may be secured to the airbox, the one or more first hooks and one or more second hooks configured to retain an item such as a spare drive belt or other spare part.

The assembly includes a latching mechanism secured to the plenum or other portion of the hood assembly. A first hook may be secured to the first branch and a second hook may be secured to the second branch, the first hook and the second hook configured to secure the assembly to a frame of the snowmobile when the latching mechanism is engaged with a structure secured to the frame of the snowmobile.

In another aspect, an airbox includes an upper airbox shell including an upper plenum shell and a first upper branch shell and a second upper branch shell extending from the upper plenum shell. The first upper branch shell defines one or more first inlet openings, and the second upper branch shell defines one or more second inlet openings. A lower airbox shell includes a lower per plenum shell and a first lower branch shell and a second lower branch shell extending from the upper plenum shell. The upper plenum shell and the lower plenum shell cooperate to define a plenum. The first upper branch and first lower branch cooperate to form a first channel connecting the one or more first inlet openings to the plenum. The second upper branch and second lower branch cooperate to form a second channel connecting the one or more first inlet openings to the plenum. The lower plenum shell defines an outlet opening for connecting to a throttle body of an engine. The assembly further includes a storage box defining an internal volume and connected to the first upper branch shell and the second upper branch shell such that the storage box, first upper branch shell, second upper branch shell, and upper plenum shell are co-molded as a single part that forms a ring encircling an area. One or more baffles may be positioned within the plenum and define an indirect path from the outlet opening to both of the one or more first inlet openings and the one or more second inlet openings. The one or more baffles may be secured to the lower plenum shell and a quarter wave chamber may be secured between the one or more baffles and the upper plenum shell.

In some embodiments, the present disclosure includes a bumper mount for attaching a bumper to a frame of a snowmobile. The bumper mount may comprise a front part, a rear part, a top surface, a bottom surface, and a perimeter wall. The rear part may include a first channel for receiving an upper front member of the frame, and a second channel for receiving a lower front member of the frame. The top surface may extend from the front part to the rear part on an upper side. The bottom surface may extend from the front part to the rear part on a lower side opposite to the top surface. The perimeter wall may at least partially surround the front part and the rear part. The perimeter wall may be configured to facilitate attaching the bumper to the frame.

Embodiments further include a bumper mount assembly for attaching a bumper to a frame of a snowmobile. The bumper mount assembly may comprise a bumper mount, and a latch assembly. The bumper mount assembly may include a front part, a rear part, a top surface, and a bottom surface extending between the front part and the rear part, and a perimeter wall partially surrounding the bumper mount. The front part may comprise a hollow section. The rear part may comprise a first channel on the top surface corresponding to an upper front member of the frame, and a second channel on the top surface corresponding to a lower frame member of the frame of the snowmobile. The latch assembly may be configured to be accommodated within the hollow section, and may comprise a pin, an actuator, a pawl, a base, and a cover.

In some embodiments, the present disclosure discloses a latch assembly for attaching a hood to a frame of a snowmobile. The latch assembly may comprise a base, a cover, an actuator, a pawl, and a pin. The base may be defined by an upper surface and a lower surface, and may comprise a first side section, a second side section, and a hollow curved structure therebetween. The upper surface defines at least a first recess at any one of the first side section and the second side section. The cover may comprise a plurality of flaps corresponding to at least a portion of the first side section and the second side section on the upper surface of the base, and a funnel shaped provision therebetween for receiving a stud of the hood latch of the snowmobile. The actuator may be defined by a front end, a rear end, an upper curve and a lower curve at the rear end. The pawl may extend from the upper curve of the actuator adjacent to the rear end outwardly to a third length. The pin may be configured to be received at the at least one first recess on the upper surface of the base. The pin may be adjacent to the pawl at the third length.

The latch assembly is adapted to fit within a section of the bumper mount. More specifically, the latch assembly is for attaching an upper body component to a frame of a snowmobile. As noted above, the latch assembly includes a base, a cover, an actuator, a pawl, and a pin. The base is defined by an upper surface and a lower surface, a first side section, a second side section, and a hollow curved structure therebetween. The upper surface defines at least a first recess at any one of the first side section and the second side section. The cover comprises a plurality of flaps and a funnel. The flaps correspond to at least a portion of the first side section and the second side section on the upper surface of the base. The funnel shaped provision receives a stud of the upper body component of the snowmobile. The actuator includes a front end, a rear end, an upper curve, and a lower curve at the rear end. The pawl extends from the upper curve of the actuator adjacent to the rear end outwardly to a third length. The pin is received at the recess on the upper surface of the base, the pin being adjacent to the pawl at the third length.

The cover is configured to be attached to the base at the plurality of flaps using at least a third fastener. Each of the plurality of flaps comprises a hole corresponding to an at least one provision of the base to receive the third fastener therewithin for attaching the base with the cover. The hollow curved structure is configured to accommodate the lower curve of the actuator. The pawl is configured to be displaced to a distance on a rotation of the actuator. It is adjacent to at least a portion of the pin in the lateral direction and is configured to displace the pin on the rotation of the actuator. The pin engages a stud of the upper body component, such as a hood, of the snowmobile and is configured to release the stud on displacement. Displacement is accomplished with a knob at the front end to rotate the actuator.

Thus, the latch assembly is configured to be attached within a hollow section of the bumper mount of the snowmobile, between the front part and the rear part, and a perimeter wall partially surrounding the bumper mount.

The disclosure herein also contemplates a method of removably securing a forward body component to a snowmobile. The method includes providing a forward frame, providing a forward body component, and engaging a bumper mount assembly. The forward frame comprises a front end, a rear end, and a bumper mount assembly secured to the front end. The forward body component includes a first and second retaining features. The first is positioned on a forward portion of the forward body and the second is positioned rearward of the first retaining feature. The first retaining feature engages the bumper mount assembly. The second retaining feature engages the forward frame to secure the forward body component to the snowmobile.

In one preferred embodiment the forward frame comprises a steering column mount and a cross-member positioned below the steering column mount. The steering column is positioned forward of the cross-member and extends to the front end of the forward frame. The second retaining feature comprises two retaining members that engage the cross-member. The steering column extends between the two retaining members.

In another preferred embodiment, the steering column is positioned rearward of the cross-member and extends to the front end of the forward frame. In such embodiment, the second retaining feature may engage the cross-member forward of the steering column.

BRIEF DESCRIPTION OF THE DRAWINGS

Preferred and alternative examples of the present disclosure are described in detail below with reference to the following drawings.

6

Figure 26:
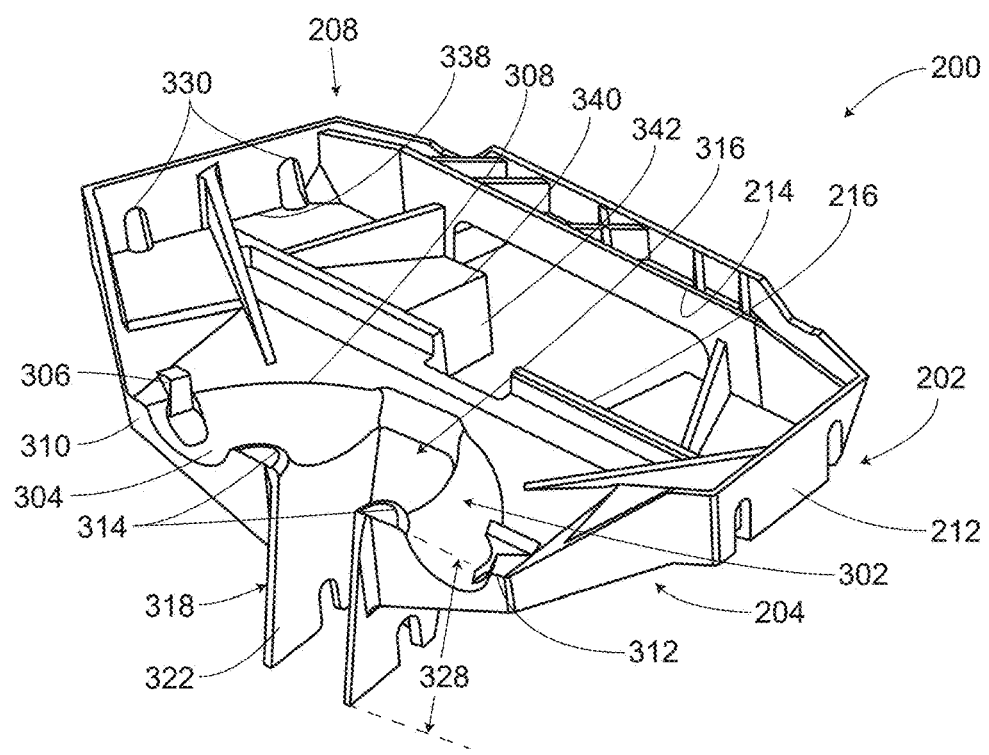
Figure 27:
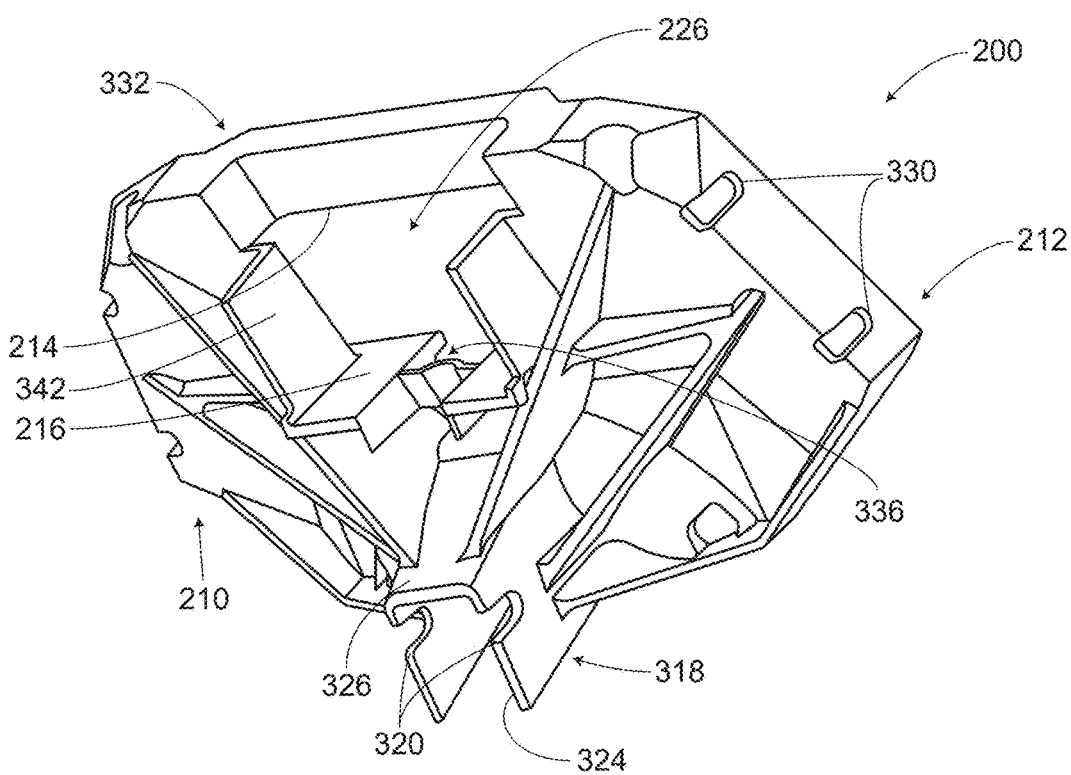
Figure 28:
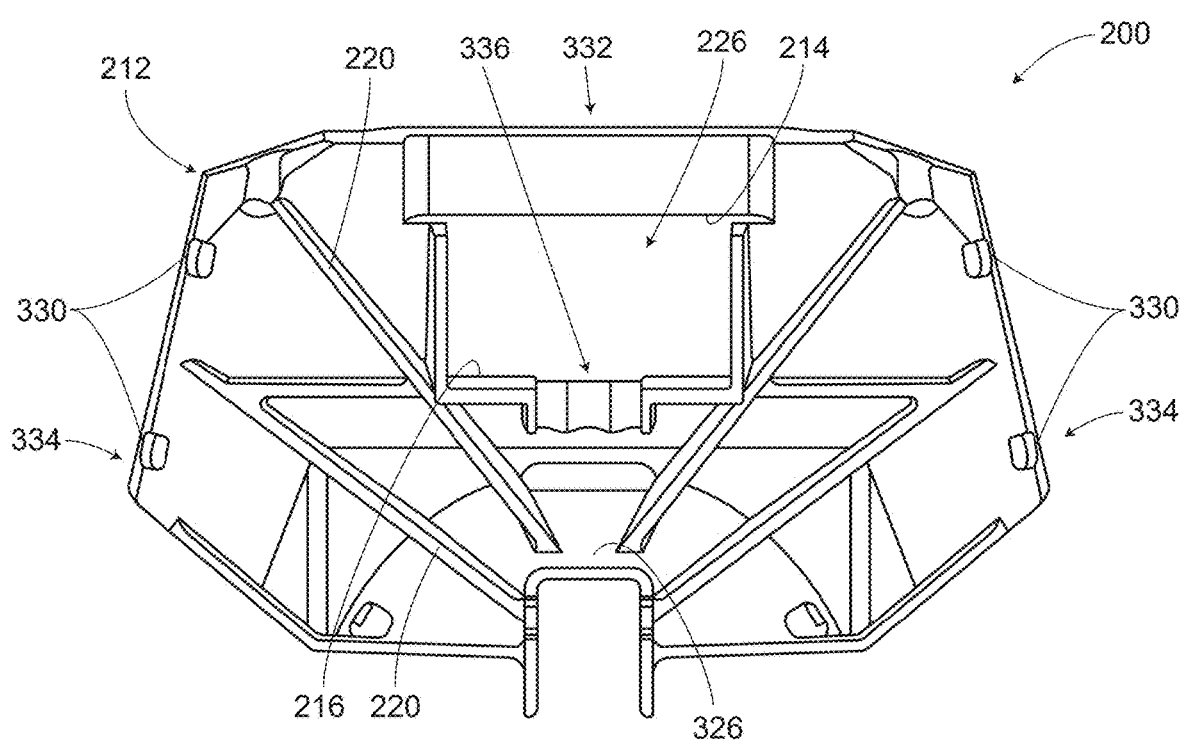
Figure 29:
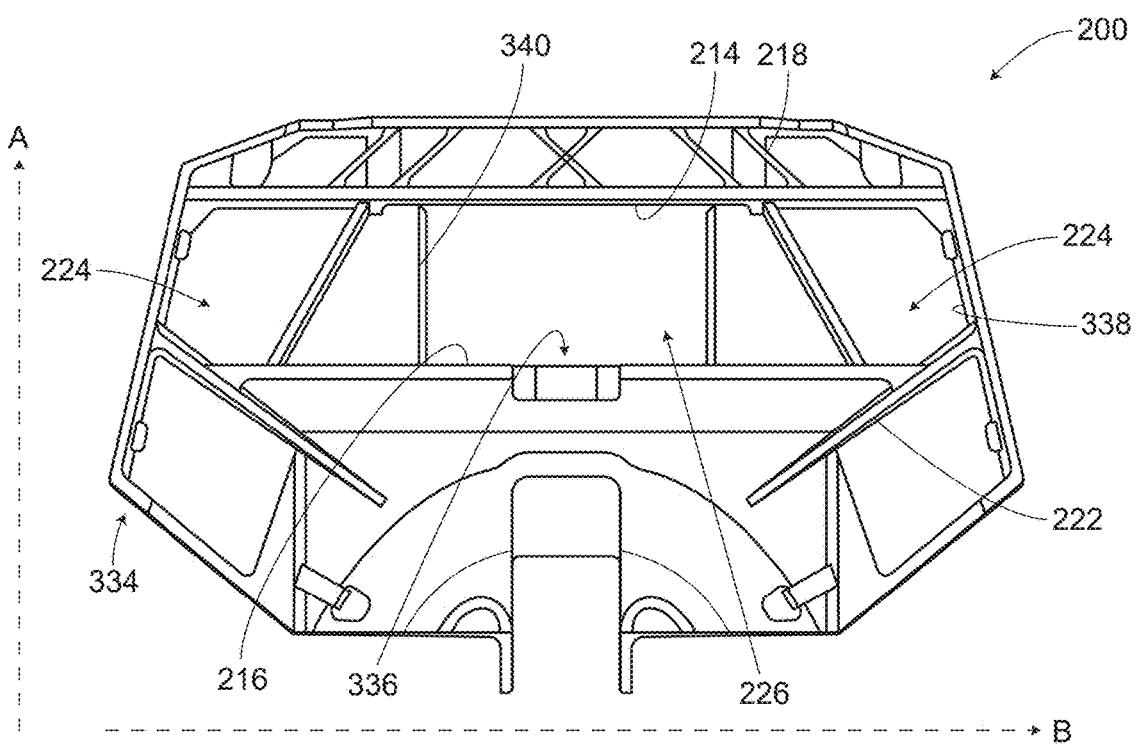
Figure 30:
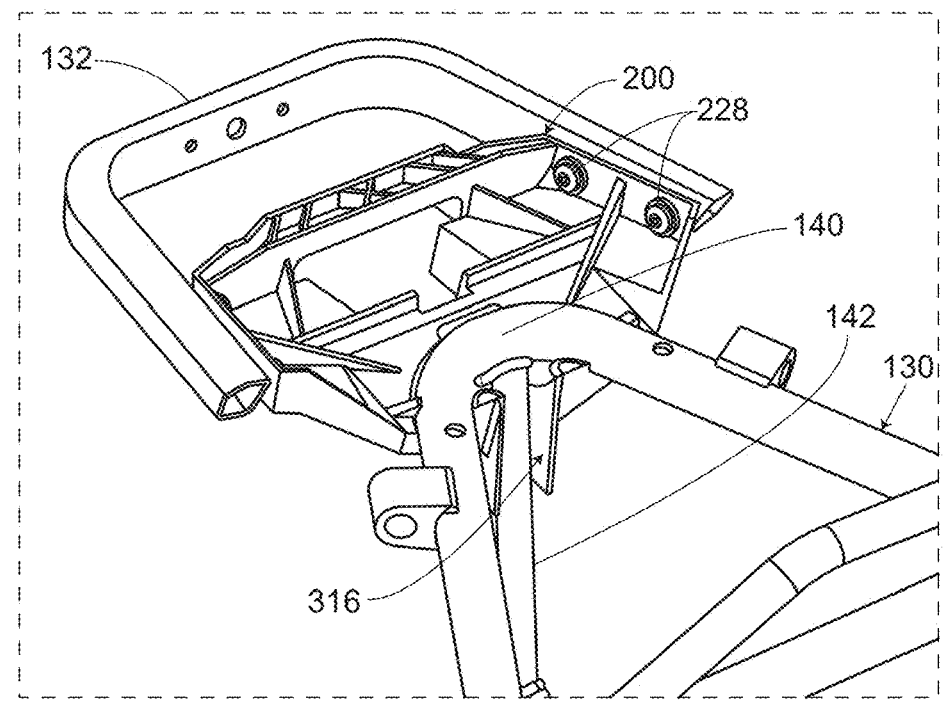
Figure 31:
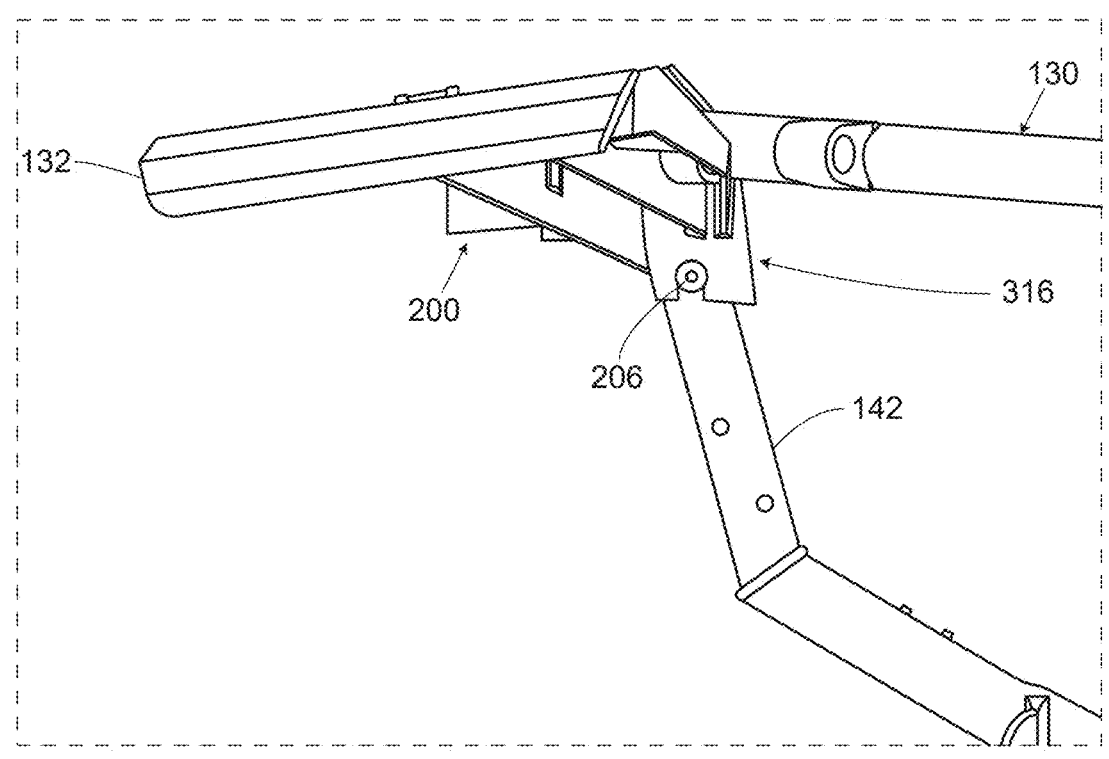
Figure 32:
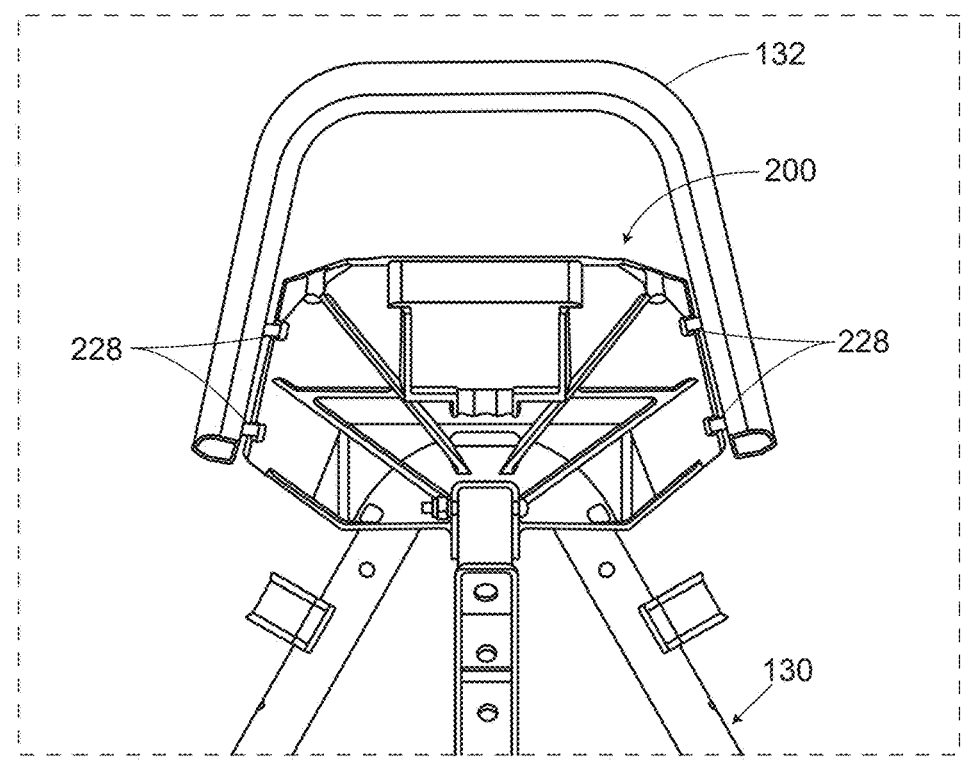
Figure 33:
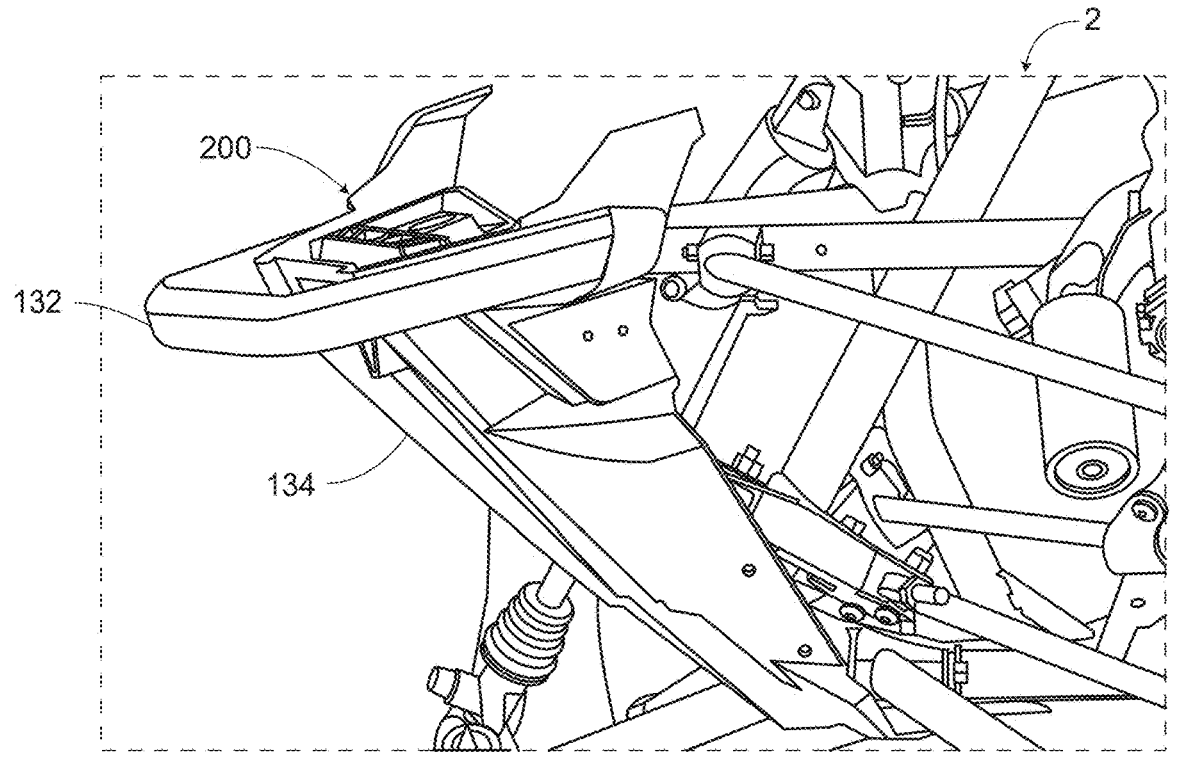
Figure 34:
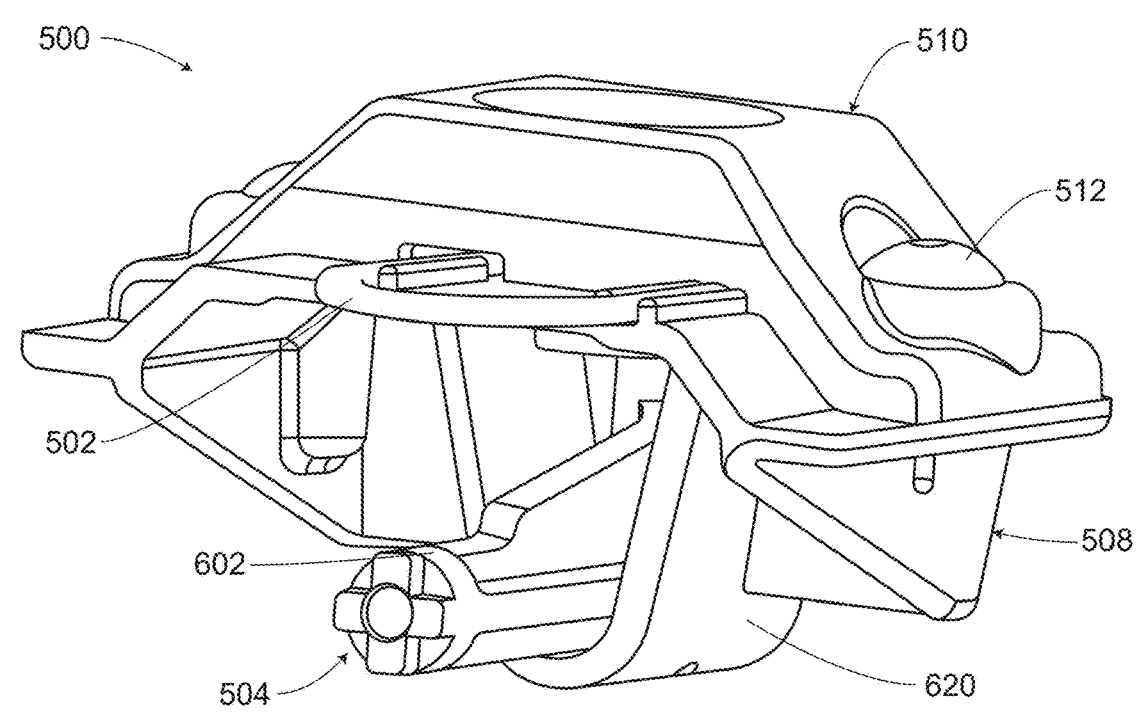
Figure 35:
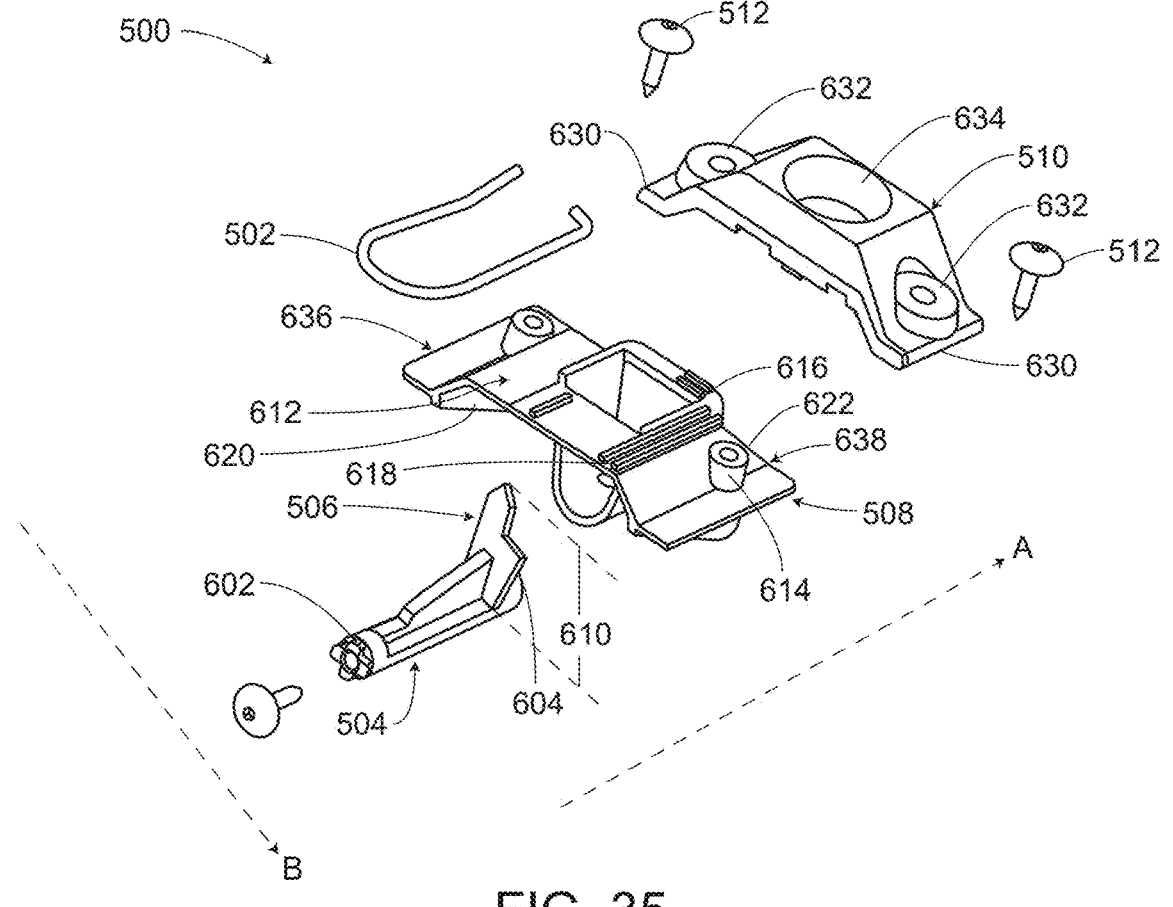
Figure 36:
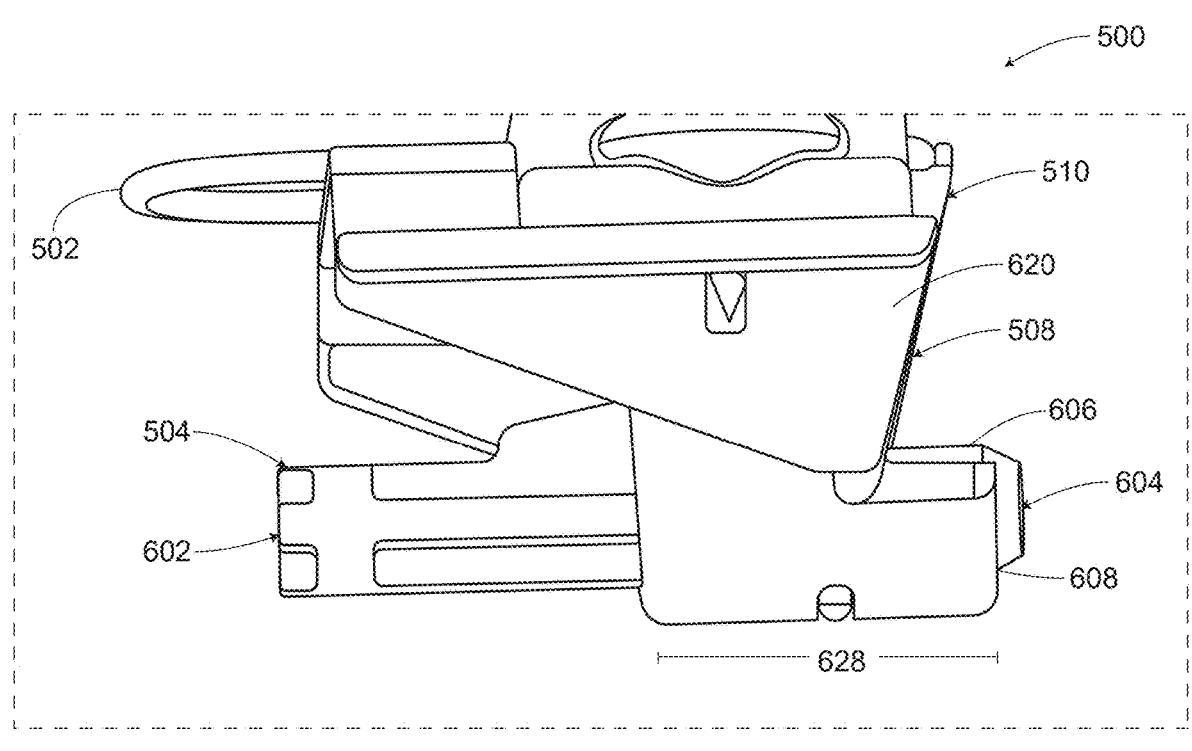
Figure 37:
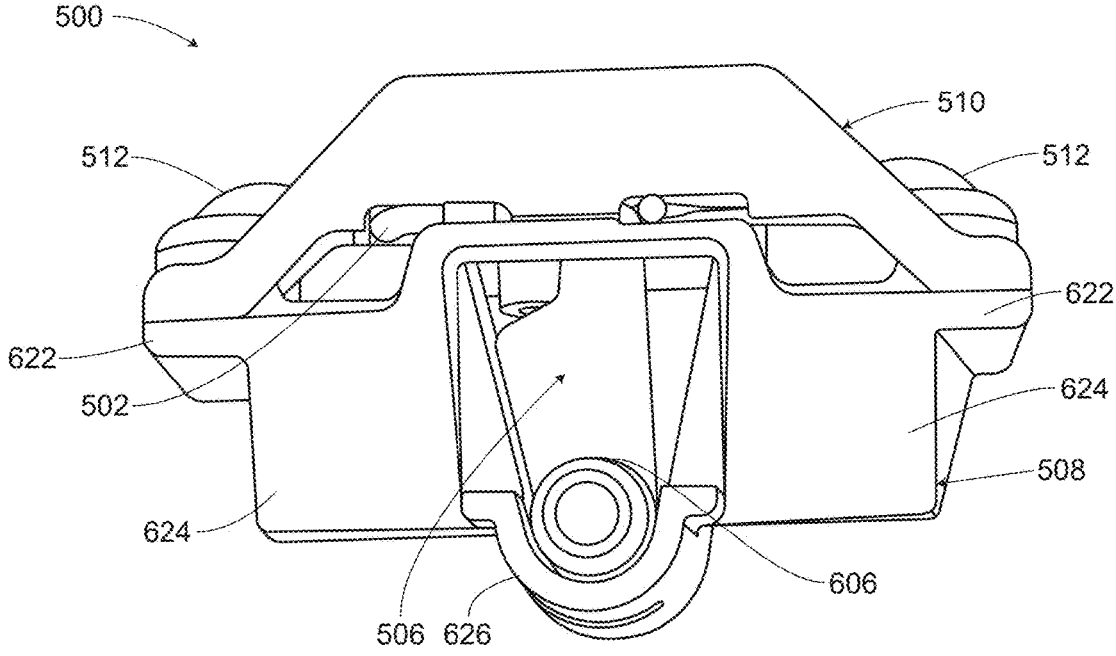
Figure 38:
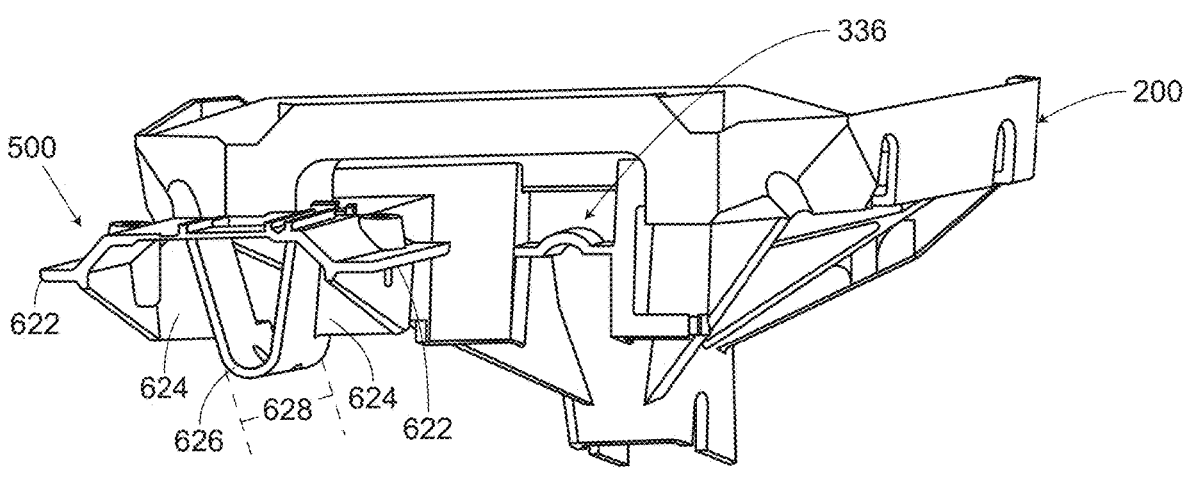
Figure 39:
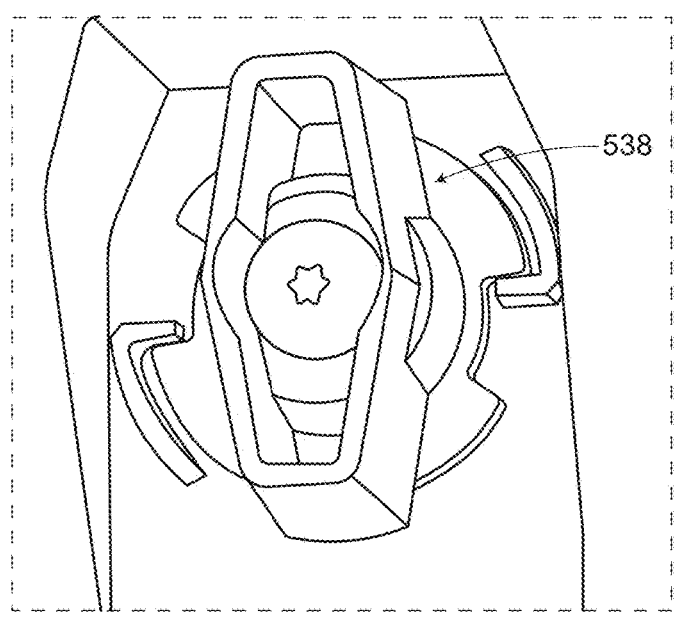
Figure 40:
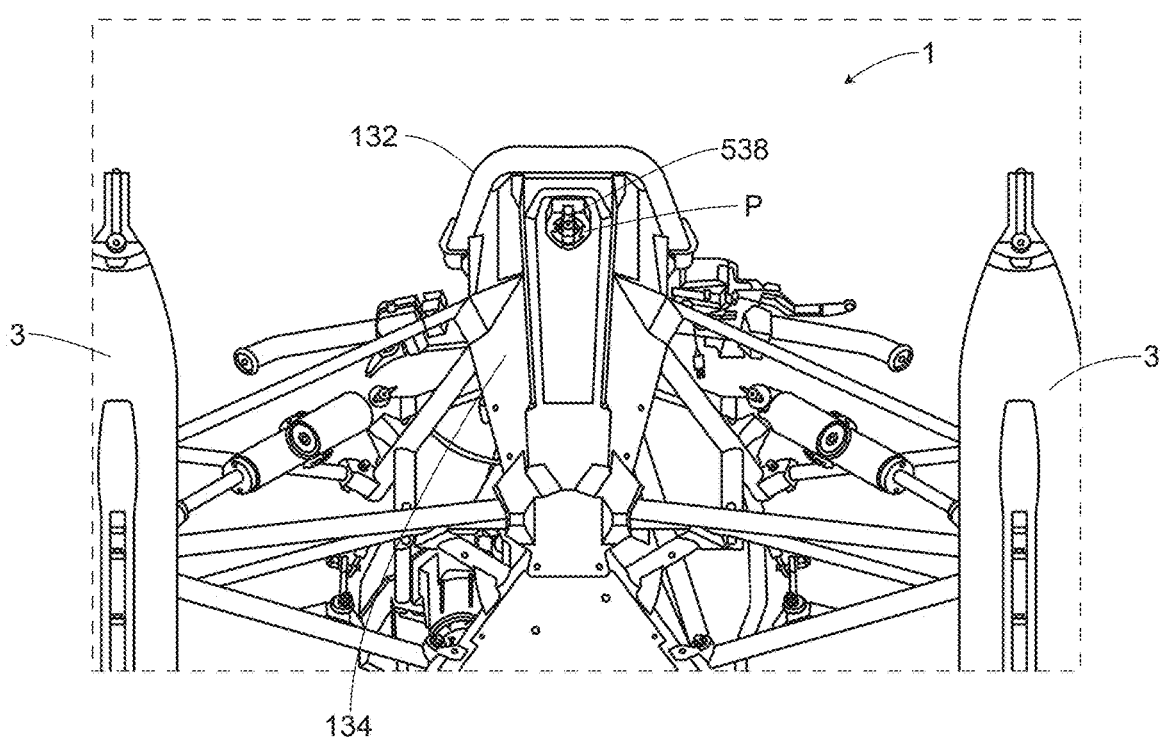
Figure 41:
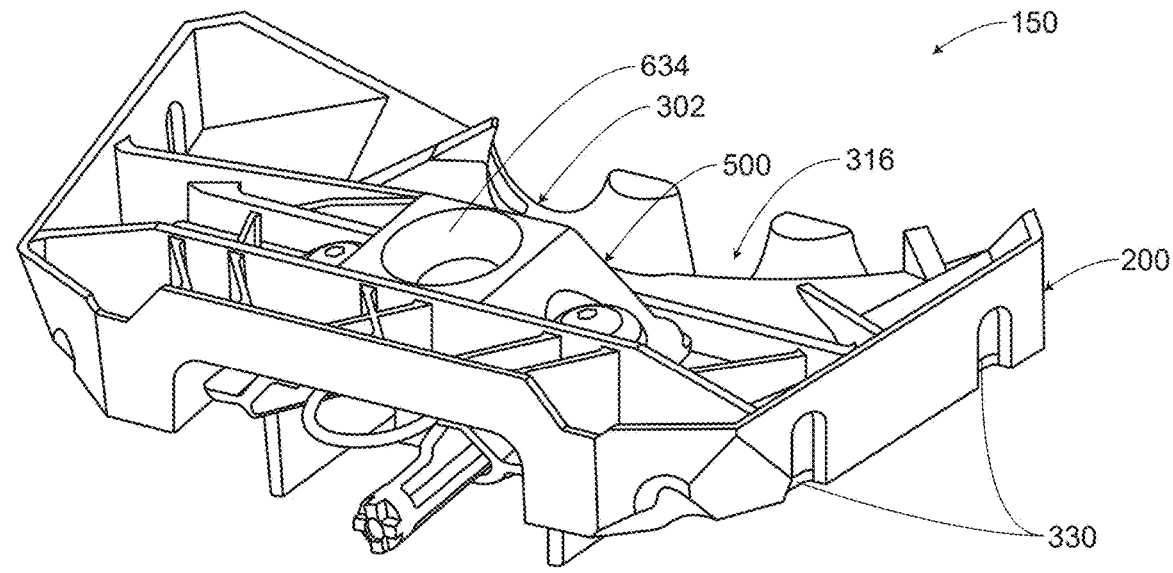
Figure 42:
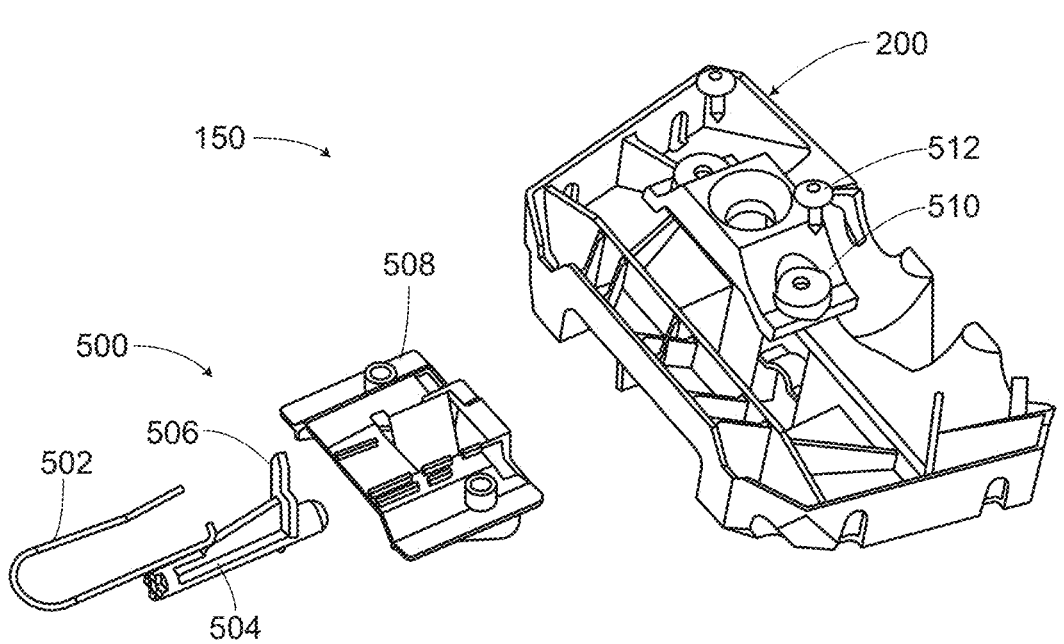
Figure 43:
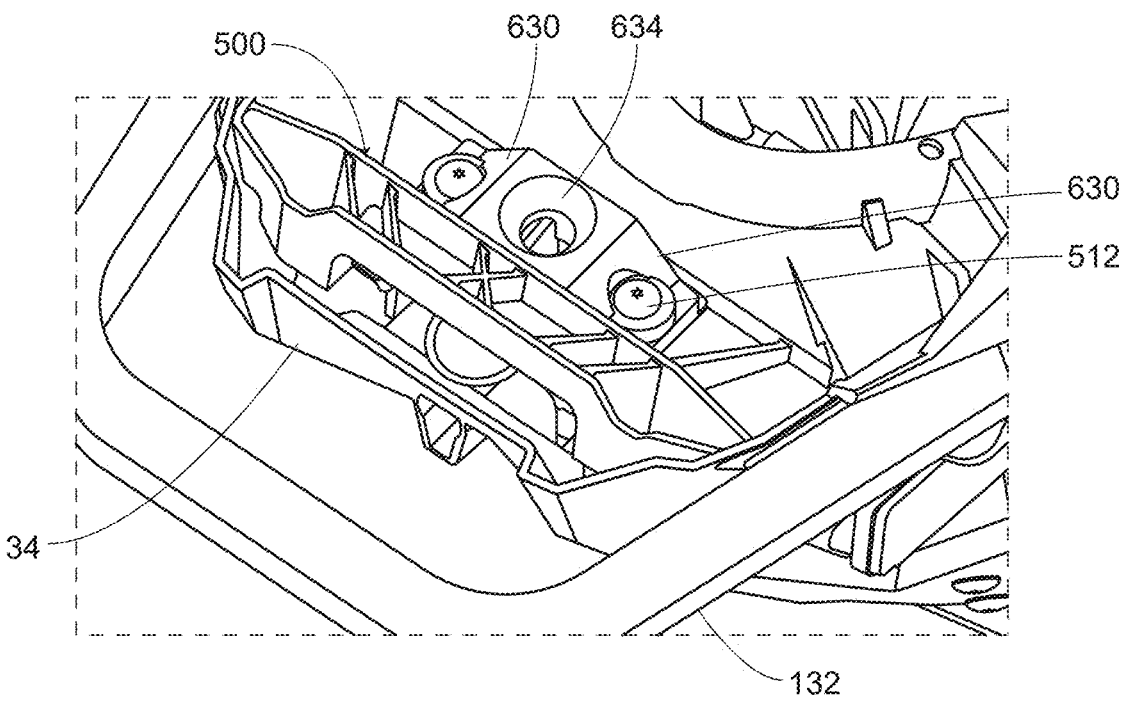
Figure 44:
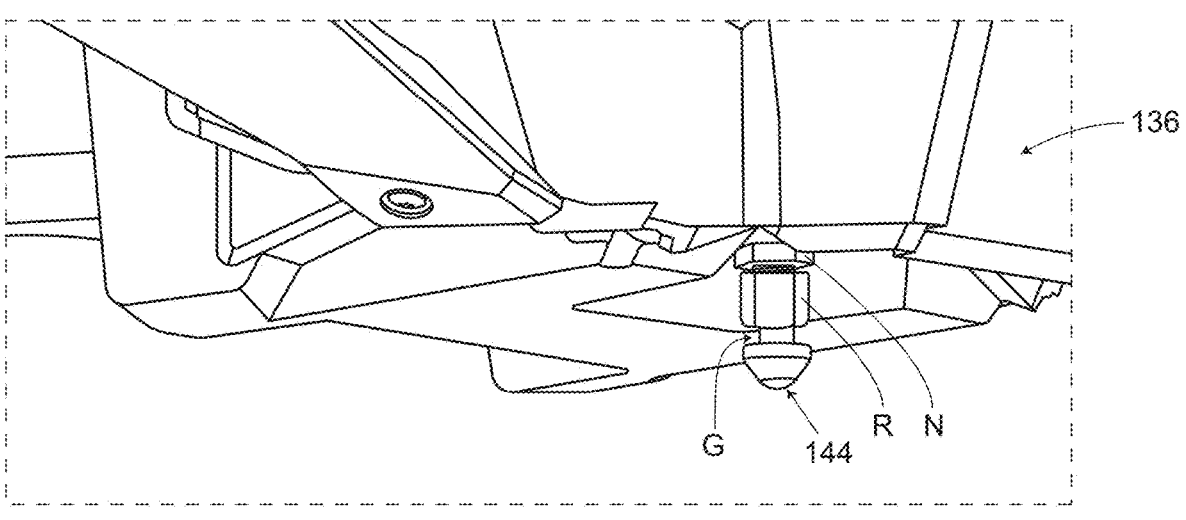
Figure 45:
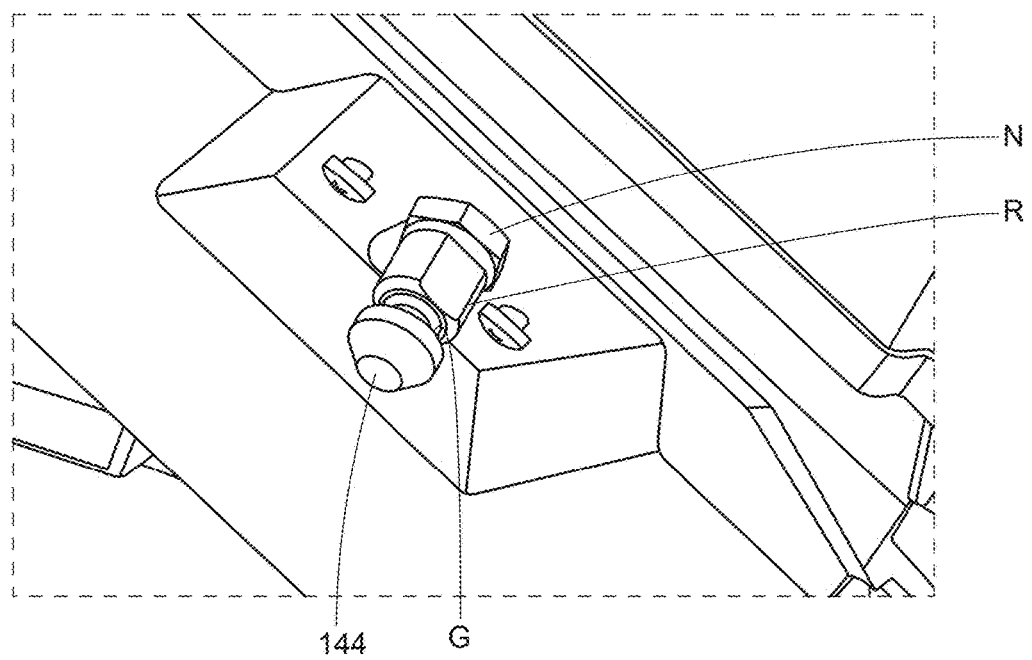
Figure 47:
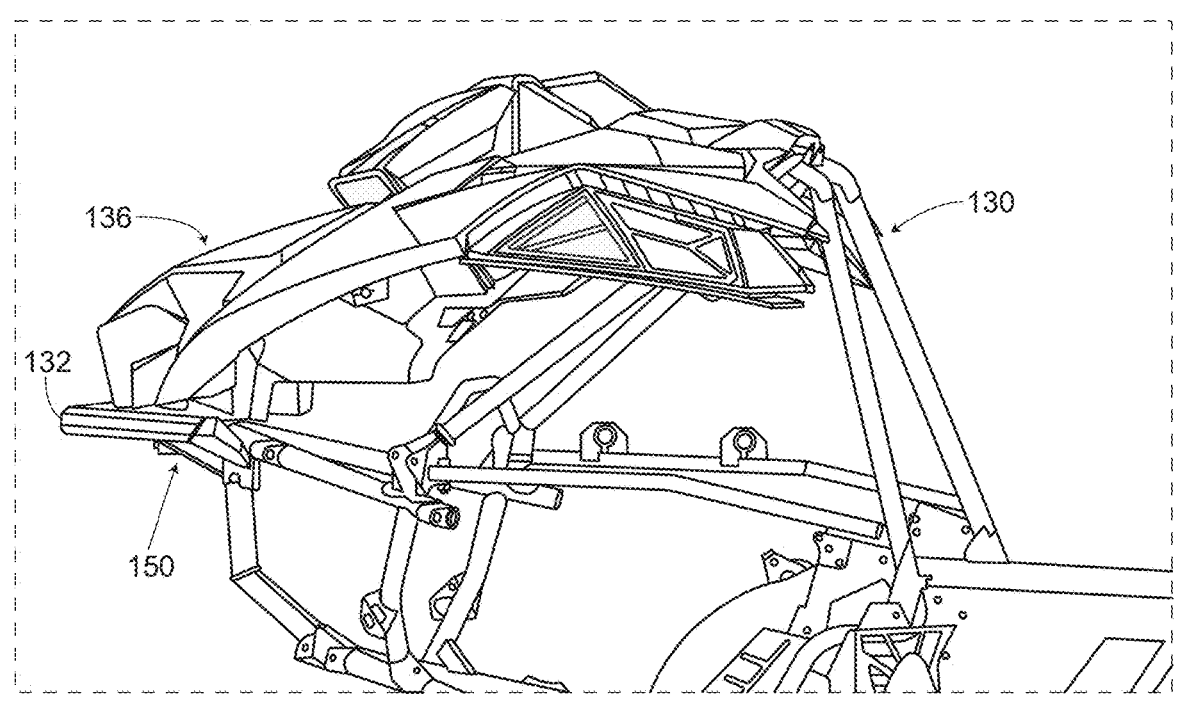
Figure 48:
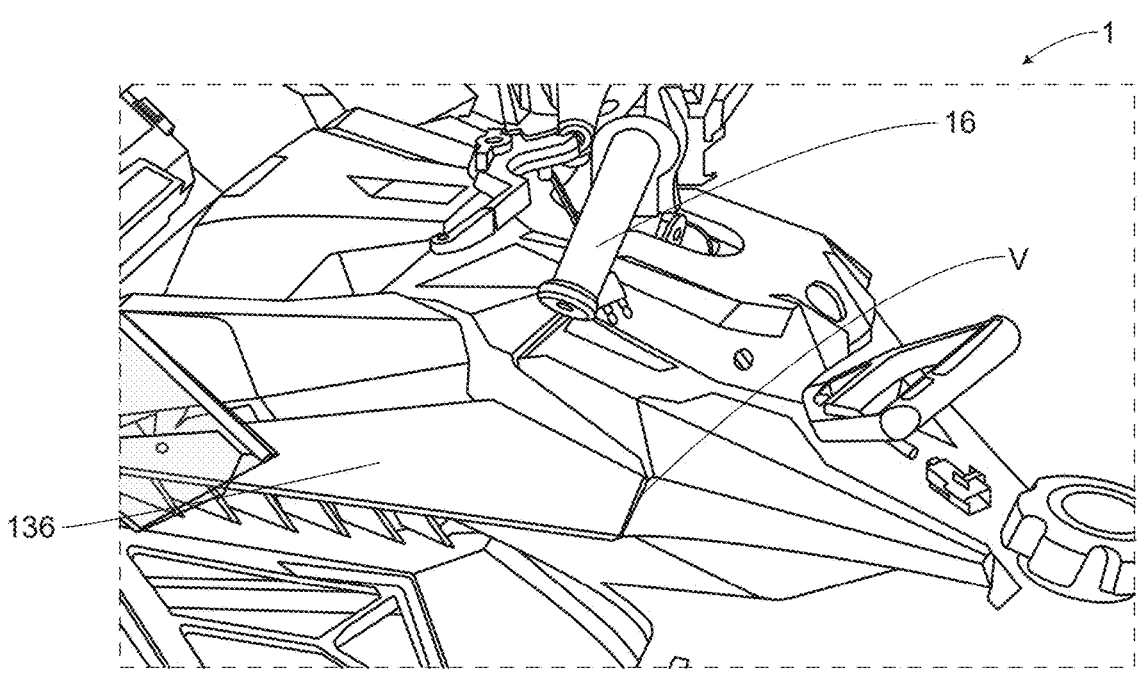
Figure 49:
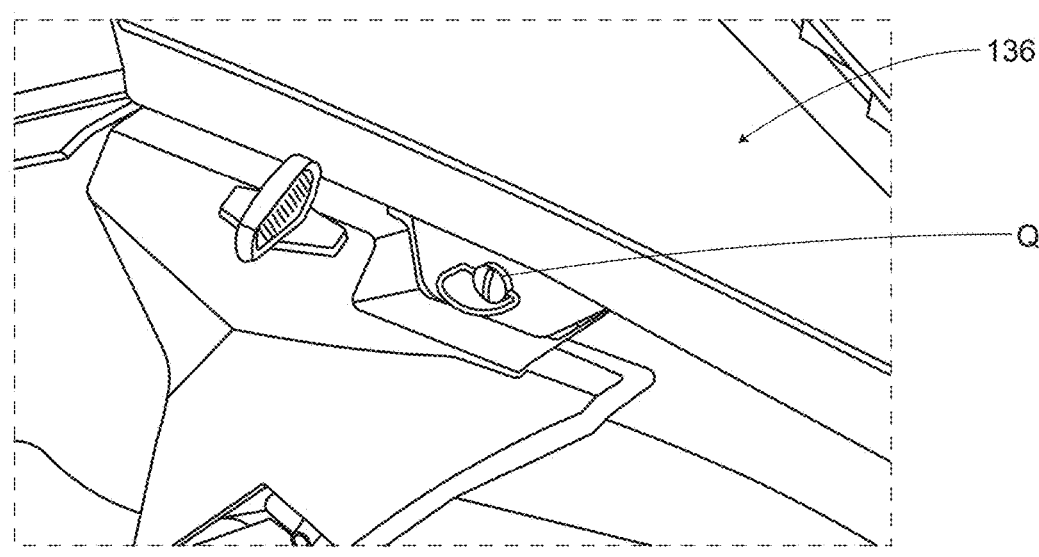

FIG. 26 illustrates an exemplary top isometric view of the bumper mount, according to some embodiments;

FIG. 27 illustrates an exemplary bottom perspective view of the bumper mount, according to some embodiments;

FIG. 28 illustrates an exemplary bottom view of the bumper mount, according to some embodiments;

FIG. 29 illustrates an exemplary top view of a bumper mount, according to some embodiments;

FIGS. 30-32 illustrate different views of exemplary bumper and bumper mount attached to a front frame member, according to some embodiments;

FIG. 33 illustrates a protective body panel placed between a bumper mount and a bumper, according to some embodiments;

FIG. 34 illustrates an exemplary latch assembly, according to some embodiments;

FIG. 35 illustrates an exemplary exploded view of the latch assembly of FIG. 32, according to some embodiments;

FIGS. 36-37 illustrate exemplary different views of a latch assembly, according to some embodiments;

FIG. 38 illustrates an exploded view of an exemplary interconnection of a base of a latch assembly and a bumper mount, according to some embodiments;

FIG. 39 illustrates an exemplary knob for releasing a hood latch, according to some embodiment;

FIG. 40 illustrates an exemplary knob provided below the bumper for releasing a hood latch, according to some embodiments;

FIGS. 41-42 illustrate an exemplary bumper mount assembly, according to some embodiments;

FIG. 43 illustrates an exemplary top perspective view of a bumper mount assembly, according to some embodiments;

FIGS. 44-45 illustrate exemplary stud of a hood latch, according to some embodiments; and FIGS. 47-49 illustrate an exemplary hood and attachment of the hood within a snowmobile, according to some embodiments.

DETAILED DESCRIPTION OF THE PREFERRED EMBODIMENTS

Figure 1:
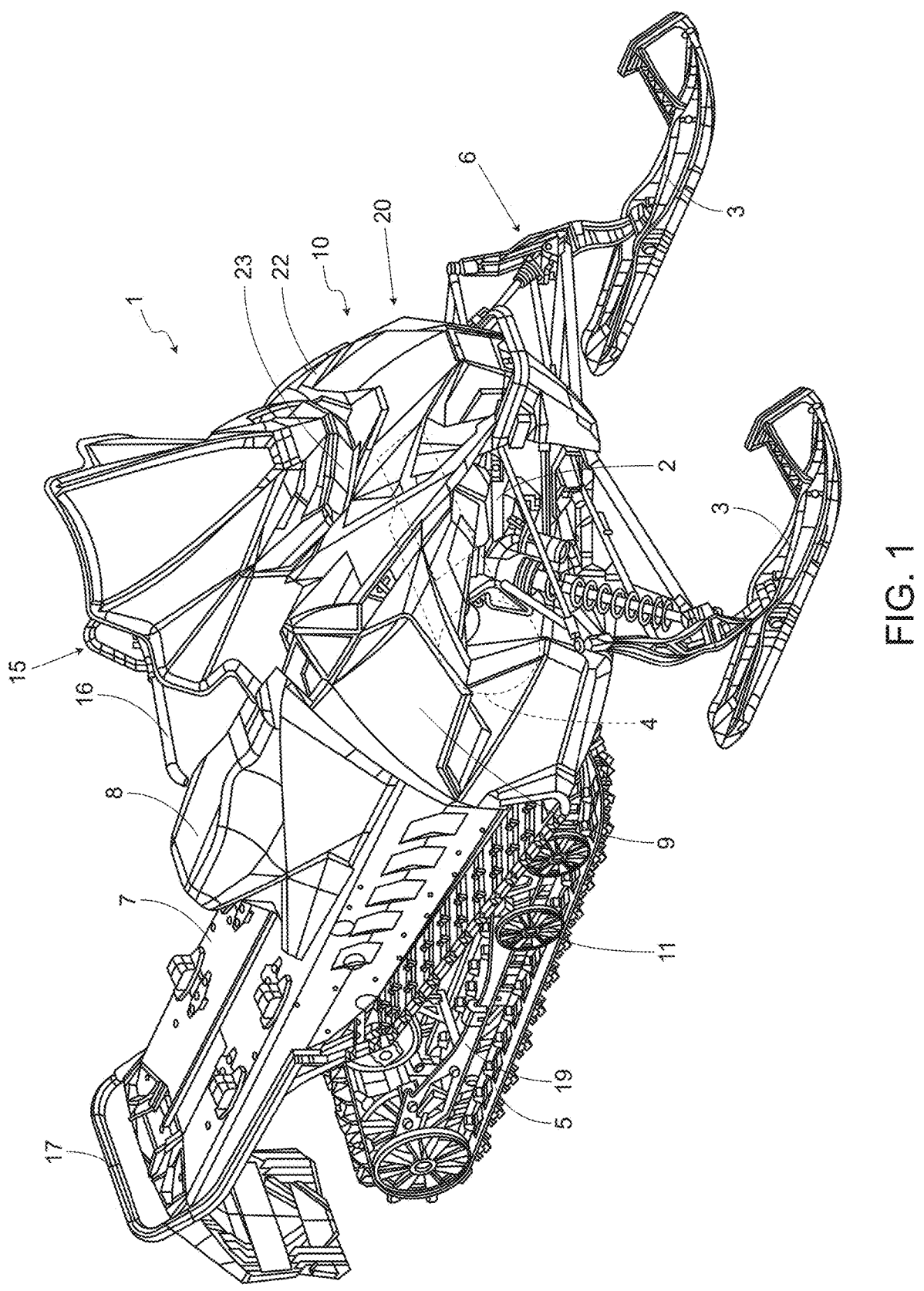
FIGS. 1-3 illustrate exemplary views of a snowmobile according to some embodiments.
Figure 2:
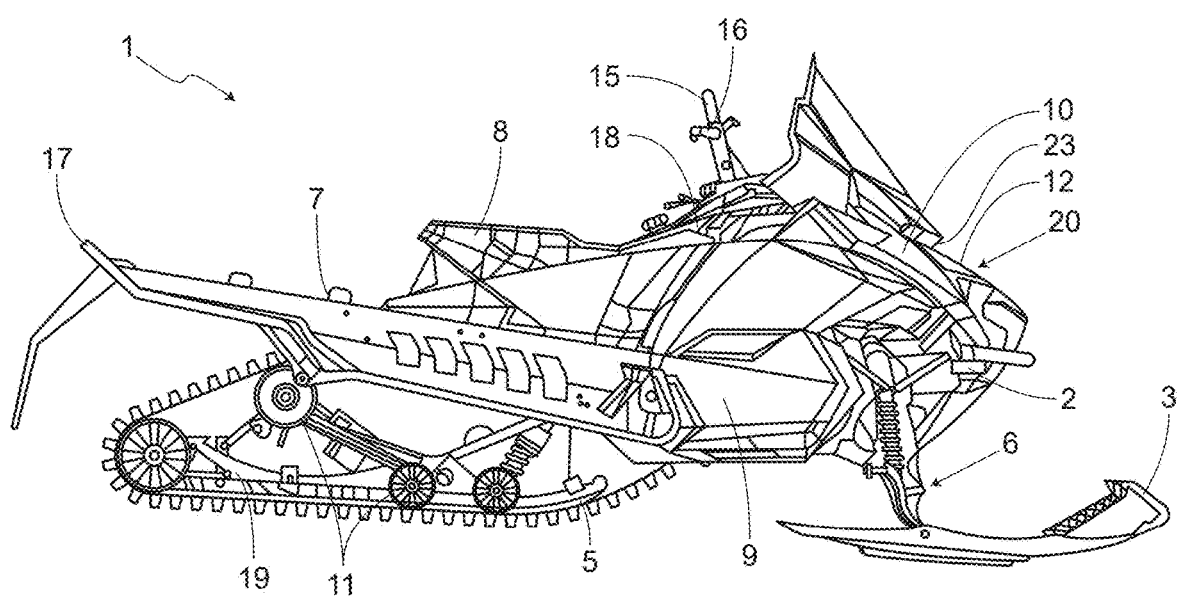
Figure 3:
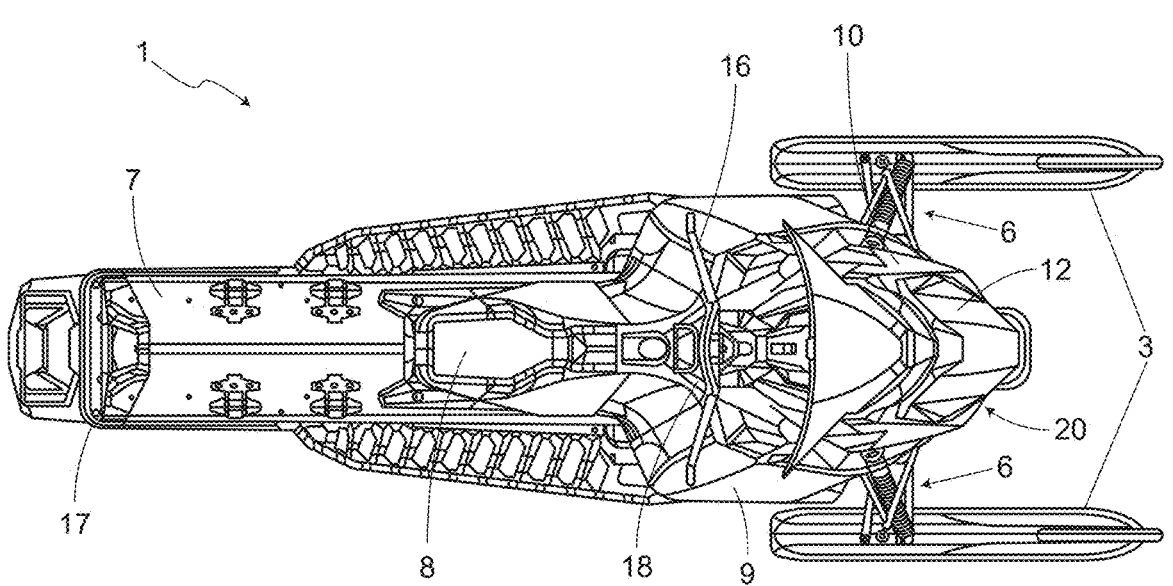

Reference is made to FIGS. 1-3, which represent a snowmobile 1, according to some embodiments of the present disclosure. The snowmobile 1 may include a body 9, a front suspension 6, and an endless track 5. The body 9 may be coupled to a chassis/frame 2. The front suspension 6 may be coupled to skis 3. The snowmobile 1 may also include at least one wheel 11 positioned within the track, a steering column 15 with at least one handle 16, a seat 8, and a tunnel 7 with a rear bumper 17.

Referring to FIG. 1, an engine 4 or motor is mounted to the frame 2 and drives the track 5 that contacts the snow in order to urge the snowmobile 1 forward. The following description references an engine 4 implemented as an internal combustion engine. However, the embodiments disclosed herein shall be understood not to be limited to use with an internal combustion engine and may be used with a snowmobile 1 including an electric motor. Where an electric motor is used, the air intake components described herein may be used to supply cooling air for batteries, friction brakes, and/or the electric motor, etc.

The present disclosure describes embodiments of a powersports vehicle, for instance a snowmobile having different components such as a front frame, a forward frame assembly, a hood, a latch assembly, a skid, a steering column, a bumper mount, and a bumper; although many aspects of the embodiments may be applicable to other off-road vehicles.

Front frames of a snowmobile are often coupled to a front suspension, a steering mount, a hood, and/or a skid and may house an engine, transmission, motor, and/or a heat exchanger assembly. Components described herein may be integral or unitary for lower cost-construction, increased structural integrity, increased performance, and/or efficiencies. For example, the vehicle may comprise a bumper either in front, rear, both sides, and combination thereof. The bumper may be attached to the frame of the vehicle using a bumper mount. The bumper mount may include components attached together therewith to form an integral bumper mount assembly. As another example, the bumper mount may be an integral part of a bumper mount assembly. Components described herein may be utilized for different powersports vehicles such as various snowmobiles, ATVs, side-by-side vehicles, and personal watercraft models/configurations. For example, the bumper mount may be attached to common front frame members for different models for attaching bumpers thereto. In addition to, or alternatively, the bumper mount assembly may include features that may be utilized to attach the hood and/or the skid to their respective positions without help of additional tools.

A suspension and rail ("skid frame") assembly 19 is encircled by the track 5 and secured to the frame 2 in order to provide shock absorption and maintain the track 5 in contact with a surface such as snow or ice. A tunnel 7 is secured to the frame 2 or forms part of the frame 2 and extends over the track 5 in order to contain snow and ice scattered by the track 5, mount the rear suspension and skid frame 19, and to provide a support surface for a seat 8. The forward portion of the snowmobile includes an upper body component 10 including, but not limited to, a hood, console, and/or headlight assembly. A side member assembly may extend along at least a portion of the upper body component 10. The upper body component (or "hood") 10 and side member may comprise a polymeric material or a fiber or particle reinforced polymeric material and covers the engine 4 and portions of the frame 2. In an illustrative example, the upper body component 10 includes an air intake and an airbox for channeling air to the engine 4 or an electrical component including, but not limited to, a battery and/or a battery management system.

Figure 4:
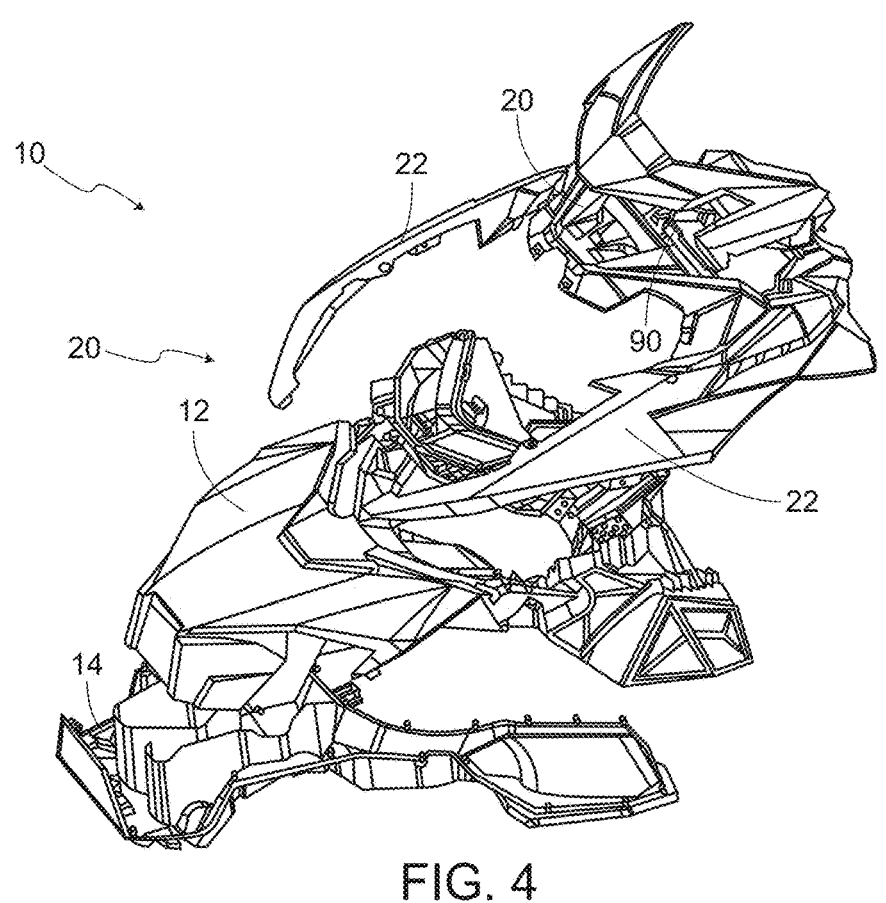
FIG. 4 is an exploded view of an assembly of front-end hood components of a snowmobile in accordance with an embodiment.
Figure 5:
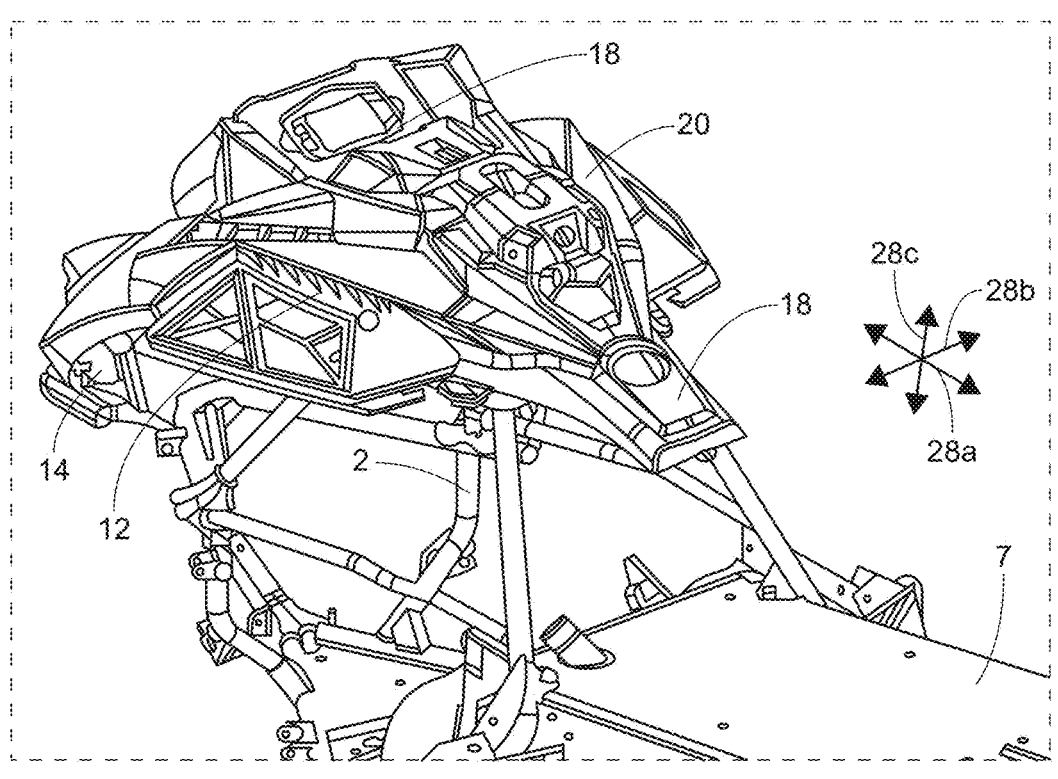
FIG. 5 is an assembled view of the assembly secured to a frame of a snowmobile in accordance with an embodiment.

FIGS. 4 and 5 illustrate the improved assembly 10 that may be used for lightweight and effective air intake system. The hood assembly 10 may be used as part of an otherwise conventional snowmobile as known in the art.

In an illustrative example, the hood assembly 10 may be secured to the front end of a snowmobile to facilitate air intake, provide a housing for various components, provide an outer shell for a portion of the snowmobile, and serve a decorative function. Unless otherwise noted, the components of the hood assembly 10 may be made of a rigid plastic, metal, or composite material, or other suitable material.

The hood assembly 10 may include an upper airbox shell 12 and a lower airbox shell 14 that cooperate to form an airbox. As shown in FIGS. 4 and 5, the upper airbox shell may be the same panel/shell that functions as a portion of the outer surface of the snowmobile hood, thus saving weight and extra-part expense. A console 18 may secure to the upper airbox shell 12 and have instruments (speedometer, fuel gauge, etc.) mounted therein. An upper body member 20 secures to the upper airbox shell 12. Upper body member 20 bridges from shell 12 to other body panels to and the console. It may also cover portions of the upper airbox shell 12. The upper body member 20 preferably has side members 22 incorporated therein that form upper body portions and the sides of the hood. The lower air box shell 14 secures to a front frame 2 of the snowmobile that also houses the engine (see, e.g., the engine 4 of FIG. 1) of the snowmobile. The tunnel 7 of the snowmobile extends rearwardly from the front frame 2 and the track of the snowmobile (see, e.g., the track 5 of FIG. 1) circulates at least partially within the tunnel 7.

The front frame 2 and tunnel 7 may define a longitudinal direction 28a, a transverse direction 28b, and a vertical direction 28c that are all mutually perpendicular. The longitudinal direction 28a may correspond to the direction of movement of the snowmobile when driven in a straight line. The vertical direction 28c may correspond to the direction of gravity.

Figure 6:
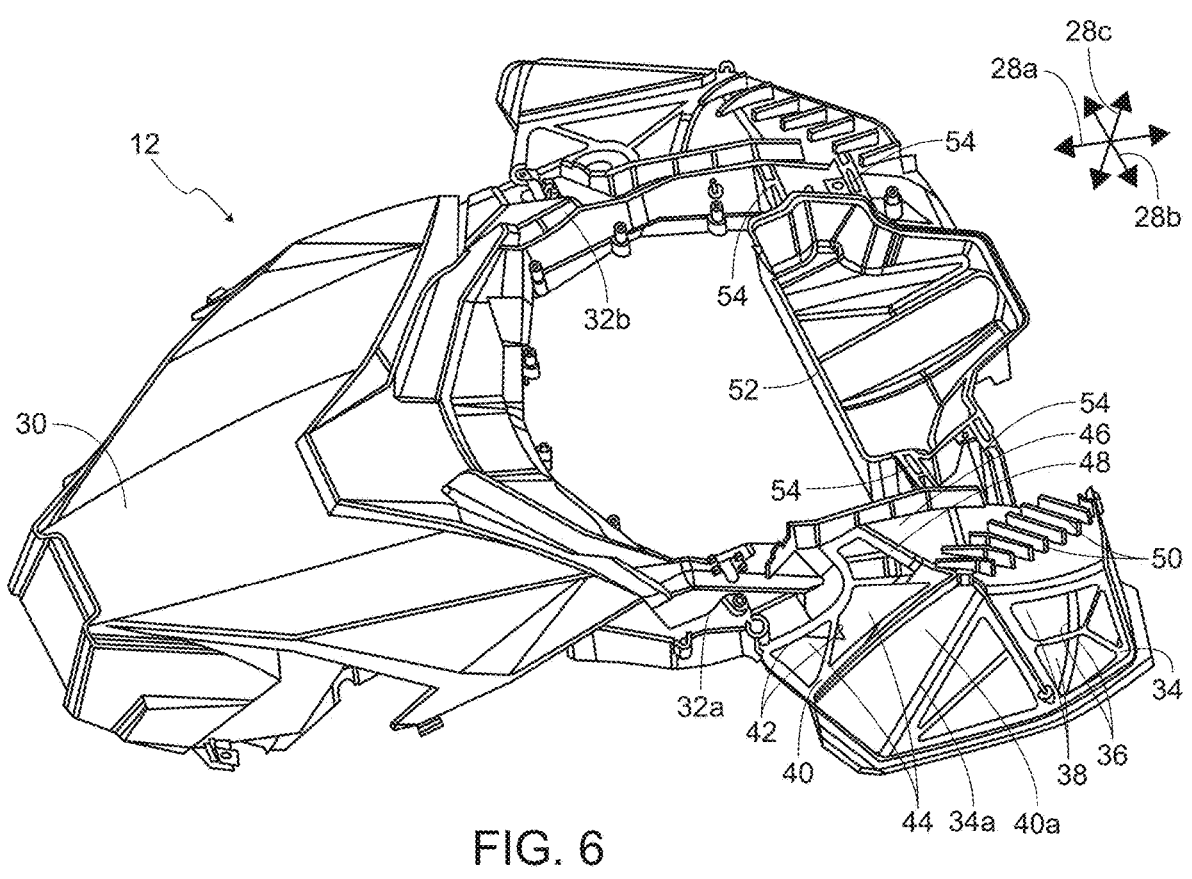
FIG. 6 is an isometric view of an upper airbox shell in accordance with an embodiment.

Referring to FIG. 6, the upper airbox shell 12 may include one or more air intake ducts. In a non-limiting example, the upper airbox shell 12 includes a plenum shell 30 from which branch shells 32a, 32b extend rearwardly along the longitudinal direction 28a. The branch shells 32a, 32b are offset from one another along the transverse direction 28b such that a gap is present between the branch shells 32a, 32b. An air intake housing of each branch shell may be provided with an outward facing surface 34 that includes openings 36 for engine air intake. The openings 36 are preferably covered by screens 38 to avoid intake of snow or debris. As is apparent, the outward facing surfaces 34 face generally outwardly along the transverse direction 28b and may be curved and/or at a non-parallel angle to a plane parallel to the transverse direction 28b and the vertical direction 28c. The outward facing surfaces 34 may also be curved in a plane parallel to the longitudinal direction 28a and the transverse direction 28b. Ideally, the outward facing surfaces 34 face transversely to the side or, more preferably, slightly to the rear of the vehicle and slightly upwardly. Thus, the surfaces are less likely to be breached by obstacles (sticks, branches, ice, etc.) impacting the front surfaces of the snowmobile while it is in forward motion. The near vertical (or at least somewhat sloped) orientation is preferable to avoid objects, snow, or moisture from above settling on the surfaces 34. Snow, for example, can block the intake of air. As will be discussed below, the smooth transition between the surfaces and the body panels below the surfaces also avoids snow or debris piling up against the face of the surfaces 34 and, thus, blocking efficient air intake.

Each branch shell 32a, 32b may further include an inner surface 40 that defines one or more inlets 42 that may also be covered with screens 44. The inner surfaces 40 including the inlets 42 of each branch shell 32a 32b may be shielded by the side members 22 of upper body member 20 or otherwise not face outwardly when combined with the other components of the assembly 10. In the illustrated embodiment, the inner surface 40 and the inlets 42 face forwardly and upwardly in a plane parallel to the longitudinal direction 28a and the vertical direction 28c. A gap is maintained between the side members 22 and the inlets 42 to allow airflow therethrough.

The branch shells 32a, 32b may additionally define one or more inlets 46 that may be shielded when the assembly 10 is assembled. In the illustrated embodiment, the one or more inlets 46 are defined on a surface 48 that extends across from the upper edge of the surface 34 to the upper edge of the surface 40. The surface 48 may face generally upwardly (e.g., within 15 degrees of) parallel to the vertical direction 28c. The surface 48 may have vanes 50 formed thereon. The vanes 50 may function to maintain a gap between the air intake housing and the hood, to guide air to the one or more inlets 46, and to reduce visibility of components positioned inwardly form the branch shells 32*a*, 32*b* to improve visual appeal of the snowmobile.

The surface 34 is an outboard surface having a forward end 34*a*, that may be an outboard end of the surface 34. A solid surface 40*a* of each air intake duct may extend between the forward end 34*a* and the surface 40. As shown elsewhere (see, e.g., FIGS. 16 and 17), the surfaces 48 and 40 of the air intake ducts may be covered by the side members 22 whereas the surface 40*a* is exposed. In this manner, when the snowmobile 1 is moving forward, debris will strike the side members 22 and the surface 40 whereas the outboard facing surface 34 will be substantially (e.g., within 5 degrees of) tangential to the path of such debris, which will inhibit damage to and obstruction of the screens 38.

Also shown in FIG. 6, a storage box 52 is mounted between the branch shells 32*a*, 32*b* such that an area between the plenum shell 30, branch shells 32*a*, 32*b*, and the storage box 52 remains open to provide access to and/or for receiving one or more components extending to the console 18. The open area may have an area of between 0.1 and 0.4 square meters in some embodiments. In the illustrated embodiment, two arms 54 extend generally in (e.g., within 15 degrees of) a transverse direction 28*b* from each side of the storage box 52 and connect to the branch shells 32*a*, 32*b*, respectively. In the illustrated embodiment, the arms 54 comprise two or more plates with the long dimension thereof generally (e.g., within 15 degrees of) parallel to the vertical direction 28*c*. The arms 54 suspend the storage box 52 between the air intake housings and provide lateral reinforcement to the air intake housings. Alternatively, the branch shells may extend out to the storage box 52; or, conversely, the storage box may extend all the way to the branch shells 32*a*, 32*b*. Although two arms 54 are shown on each side of the storage box 52, the description is not limited to such, and any number of arms 54 may be provided on either side of the storage box 52.

The ring formed by the plenum shell 30, branch shells 32*a*, 32*b*, storage box 52, and arms 54 provides a single component that may be pre-formed by injection molding or other plastic fabrication process. This single component provides structural strength, simplifies assembly, and provides a single part number for maintaining inventory. In some implementations, the storage box 52 may be replaced with a structural member that provides structural rigidity but does not provide a separate internal storage compartment. Alternatively, the branch shells may extend all the way around to close the loop. The storage box 52 may also be substituted for some other component performing another function.

Figure 7:
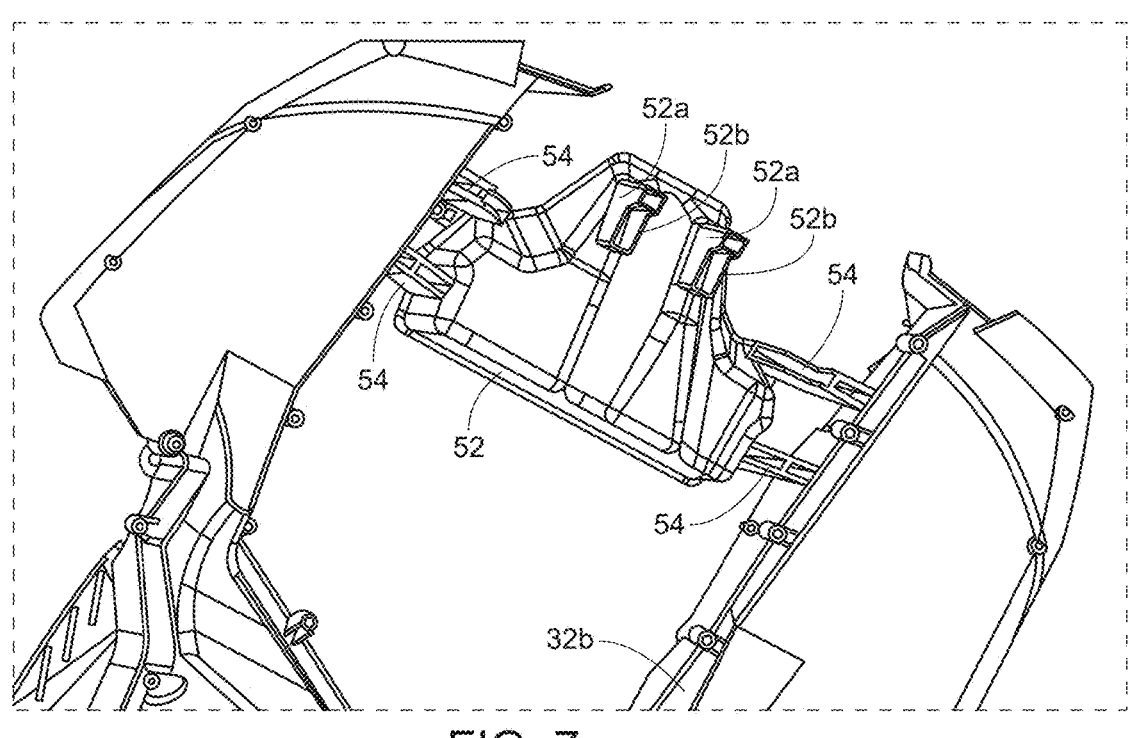
FIG. 7 is a partial isometric view of the underside of the upper airbox shell in accordance with an embodiment.
Figure 8:
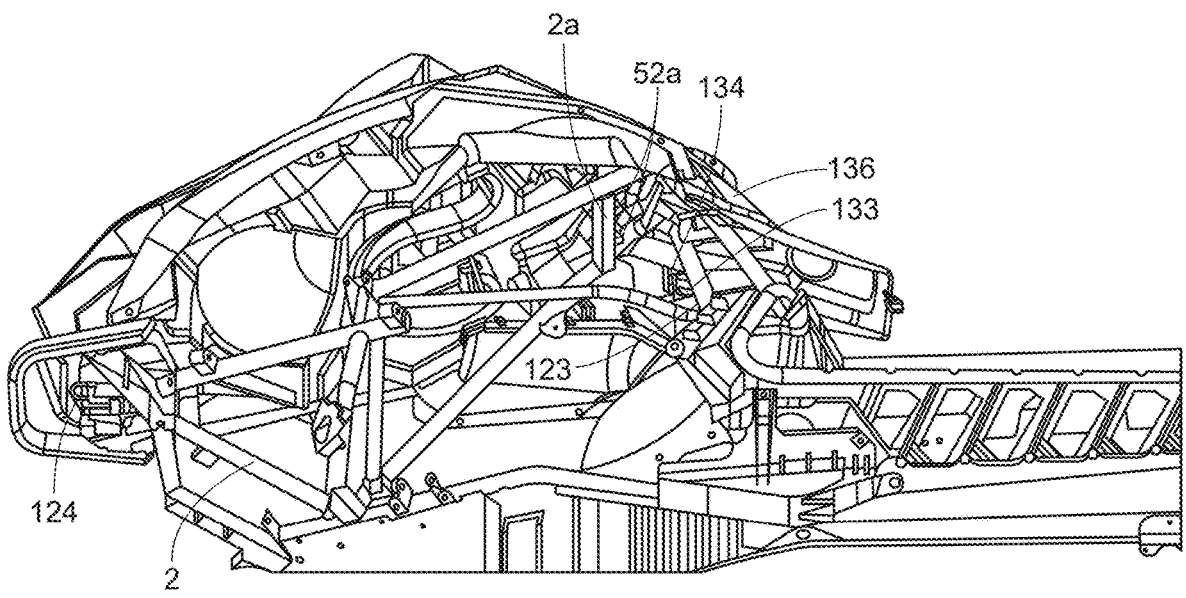
FIG. 8 is an isometric view of the underside of the front frame and body assemblies.
Figure 9:
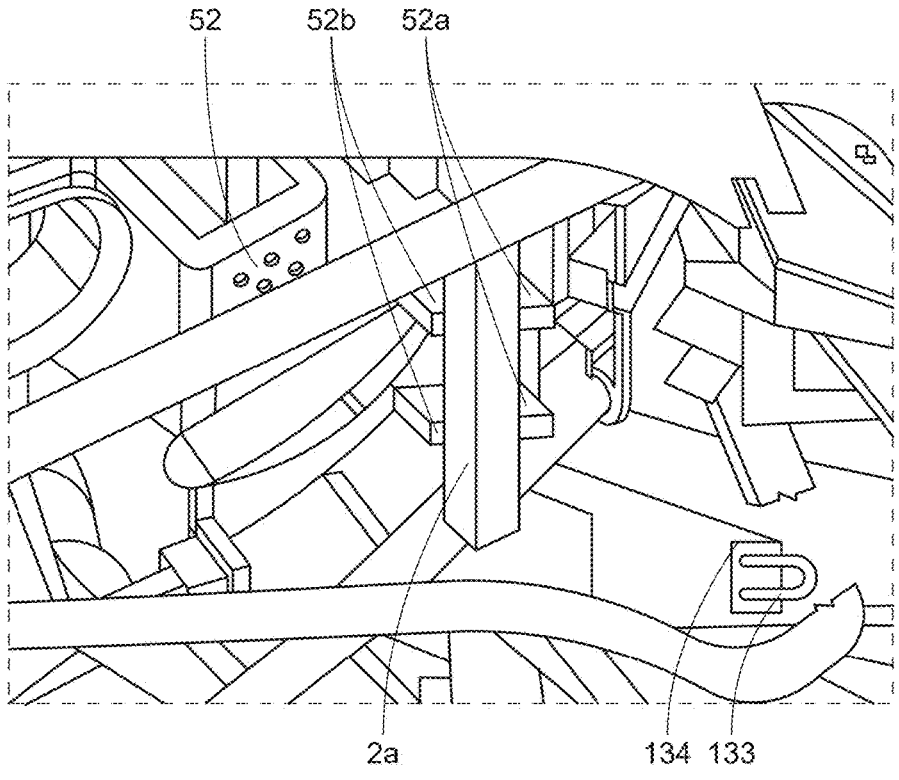
FIG. 9 is a close-up view of a frame cross-member of an embodiment.
Figure 18:
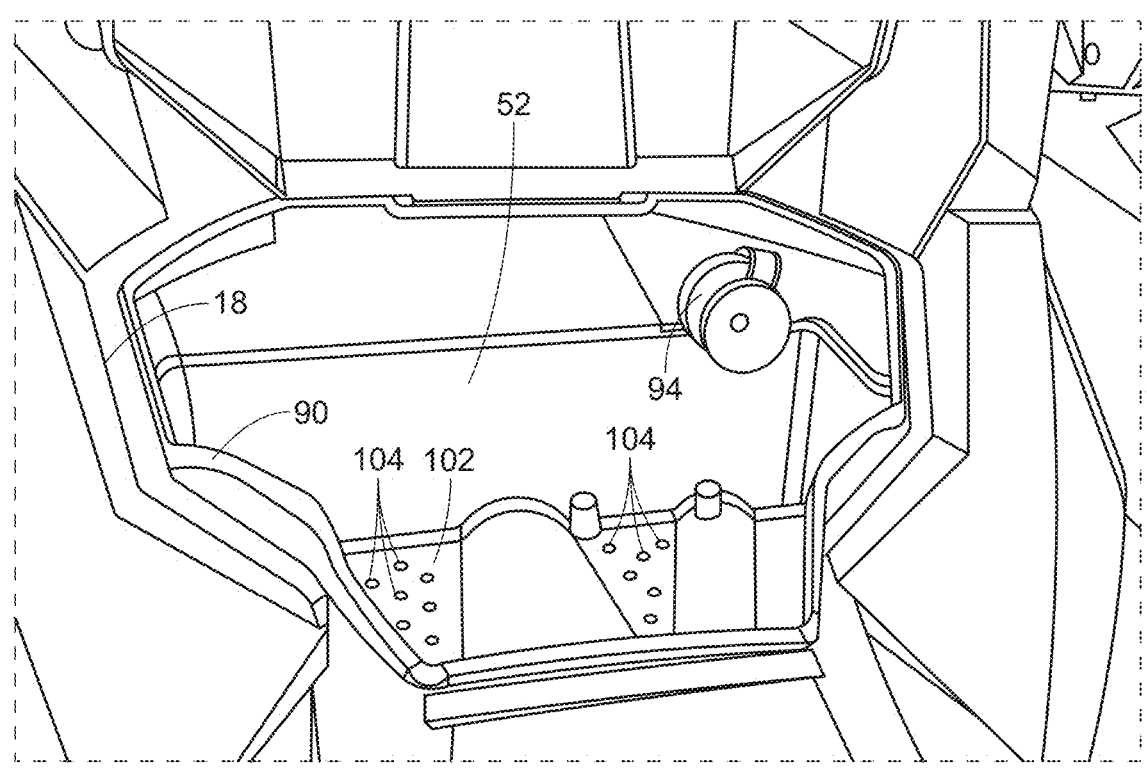
FIG. 18 is an isometric view of the interior of a storage box in accordance with an embodiment.
Figure 19:
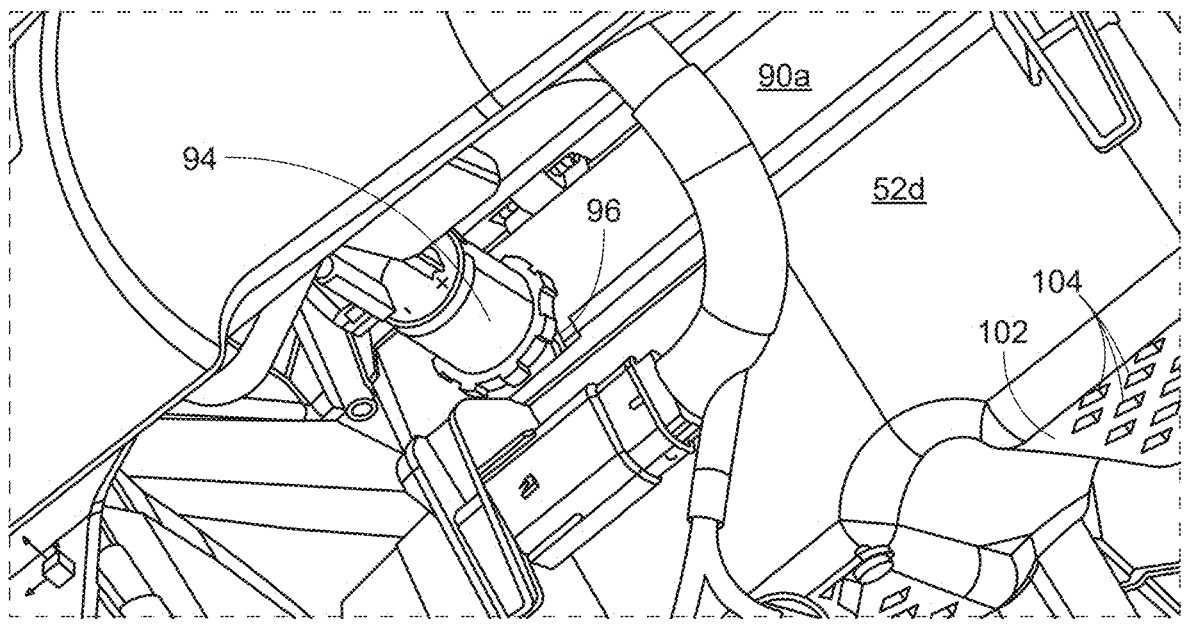
FIG. 19 is an isometric view of an outlet secured to the storage box in accordance with an embodiment.

Referring to FIGS. 7-9, the storage box 52 may further strengthen or otherwise support the part formed by the upper airbox shell 12 and storage box 52 by including structures that rest on the front frame 2 of the snowmobile when installed, thereby resisting displacement in response to forces applied to the storage box 52 or to the branch shells 32*a*, 32*b*. The illustrated implementation, the structures may be retaining features that are illustratively implemented as feet 52*a* defining flats or notches 52*b* for receiving or positioning on a portion of the front frame 2, such as a cross-member 2*a* positioned at an upper end of the front frame 2 below a steering column mount positioned at the top of the front frame 2, the cross-member 2*a* extending between two forward frame members. As shown in FIGS. 7 and 18, the lower surface 102 positioned between the two feet 52*a* may define a channel for receiving at least a portion of the steering column 15 therein when the steering column

15 is positioned forward of the cross-member. Therefore, the steering column 15 may be positioned between the feet 52*a* when the steering column 15 is positioned in the channel. In a non-limiting example, the flats 52*b* of the feet 52*a* rest on the cross-member 2*a* with the rearward portion of the feet 52*a* projecting downward from the feet 52*a* to be positioned behind the cross-member to prevent forward movement of the upper body assembly. As described below, the upper body assembly is provided with a retaining feature that engages another retaining feature positioned on a forward portion of the frame to prevent rearward movement of the upper body assembly and allow the upper body assembly to be removably secured to the forward frame.

Referring specifically to FIGS. 8 and 9, the rearward end of the assembly may be held in place by various means. For example, hooks 133 may be formed on or secured to the fenders 22 of the hood 20 or the branch shells 58*a*, 58*b* of the lower airbox shell 14. The hooks 133 insert into openings 134 formed in a center body panel 136 secured to the snowmobile frame 2 and extend rearwardly. When the latch mechanism 134 is engaged with the stud 130, forward movement of the assembly 10 is prevented, which also prevents the hooks 133 from removing from the openings 134. With the latch mechanism 134 released, the user may pull the assembly forward in order to remove the hooks 133 from the openings 134. Other securement means may secure the assembly 10 to the front frame 2, such as one or more manually removable pins.

FIGS. 8 and 9 further illustrate that the feet 52*a* of the storage box 52 may rest on a member 2*a* of the front frame 2 when the assembly 10 is secured to the front frame 2 by the latch mechanism 124 and the hooks 133. In particular, the frame member 2*a* may seat within the notch 52*b*. The storage box 52 is therefore free to lift off the frame member 2*a* but will resist inward collapse of the assembly 10 during use.

Figure 10:
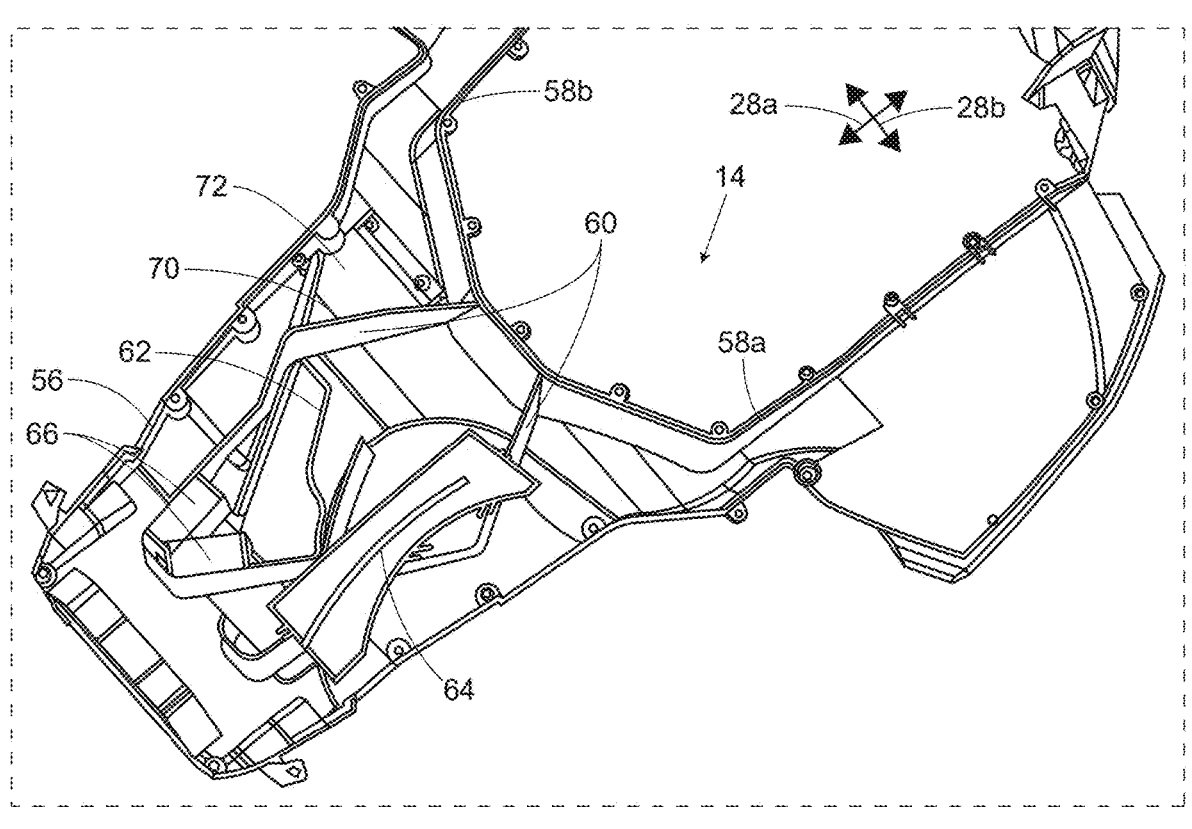
FIG. 10 is an isometric view of a lower air box shell in accordance with an embodiment.
Figure 11:
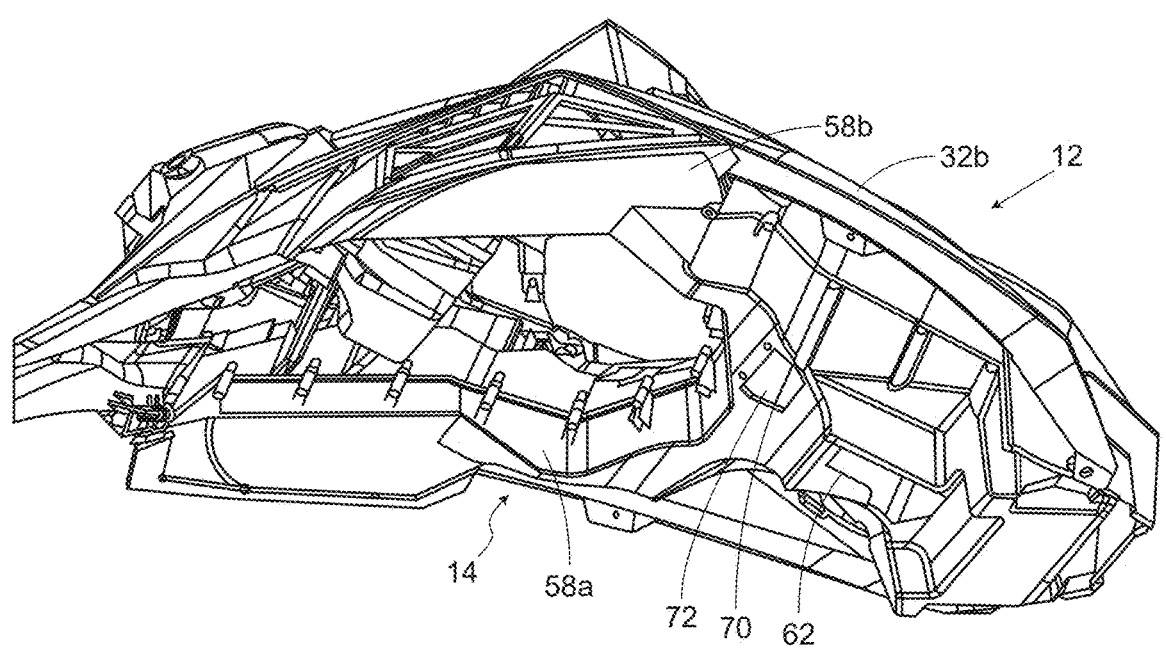
FIG. 11 is an isometric view of an airbox formed by the upper airbox shell and lower airbox shell in accordance with an embodiment.

FIGS. 10 and 11 illustrate the lower airbox shell 14, which includes a plenum shell 56 from which branch shells 58*a*, 58*b* extend rearwardly along the longitudinal direction 28*a*. The branch shells 58*a*, 58*b* are offset from one another along the transverse direction 28*b* such that a gap is present between the branch shells 58*a*, 58*b*. When joined with the upper airbox shell 14, the branch shells 36, 37 and branch shells 58*a*, 58*b* form branches that conduct air from the various openings 36, 42, 46 to a plenum defined between plenum shell 30 and plenum shell 56.

The plenum shell 56 has baffles 60 formed or secured therein. The baffles 60 ensure that an indirect path is followed by air from the various openings 36, 42, 46 to an outlet 62 through which air enters a throttle body of the engine of the snowmobile. The indirectness of the path may reduce the amount of throttle body noise that is emitted through the openings 36, 42, 46. Various features may be positioned within this path to further damp throttle body noise. For example, a quarter wave chamber 64 may be positioned between the plenums 30, 56 and provide a resonant chamber that causes destructive interference to damp the throttle body noise. Blocks of foam 66 may also be positioned within the path in order to damp the throttle body noise.

Figure 12:
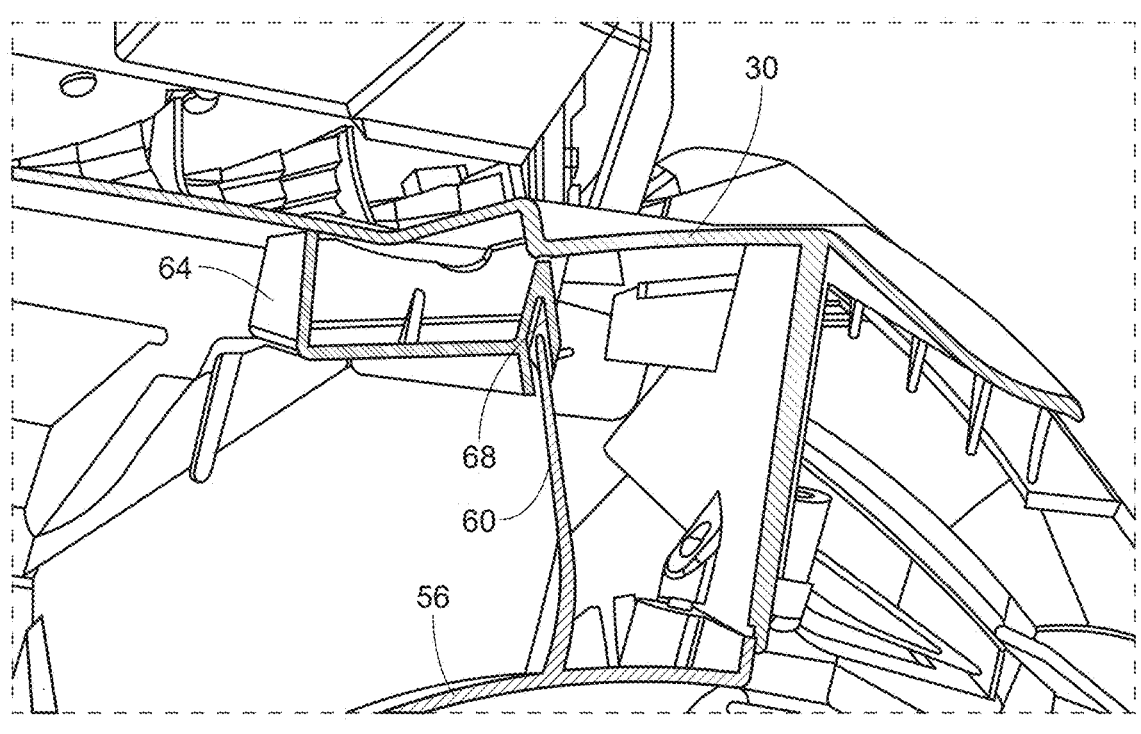
FIG. 12 is a cross-sectional view of the airbox formed by the upper airbox shell and the lower airbox shell in accordance with an embodiment.

Referring to FIG. 12, while still referring to FIGS. 10 and 11, in some implementations, the quarter wave chamber 64 is open on one side (the top side in the frame of reference of FIG. 12) and seats on one of the baffles 60. The plenum shell 30 then forms the top of the quarter wave chamber 64 when secured to the plenum shell 56. For example, the quarter wave chamber 64 may define a notch 68 for receiving one of the baffles 60.

Referring again to FIGS. 10 and 11, a backup inlet 70 may be defined in the lower airbox shell 14 and may be covered by a flap 72 that is biased to remain closed during normal operation. If the pressure within the airbox defined by the upper and lower airbox shells 12, 14 drops below a desired threshold due to decreased air flow through the openings in the air intake housings (e.g., deep snow moving over intake openings, etc.), the flap 72 will be forced open and air will be allowed to enter the airbox from inside a lower compartment of the snowmobile via the backup inlet 70.

Figure 13:
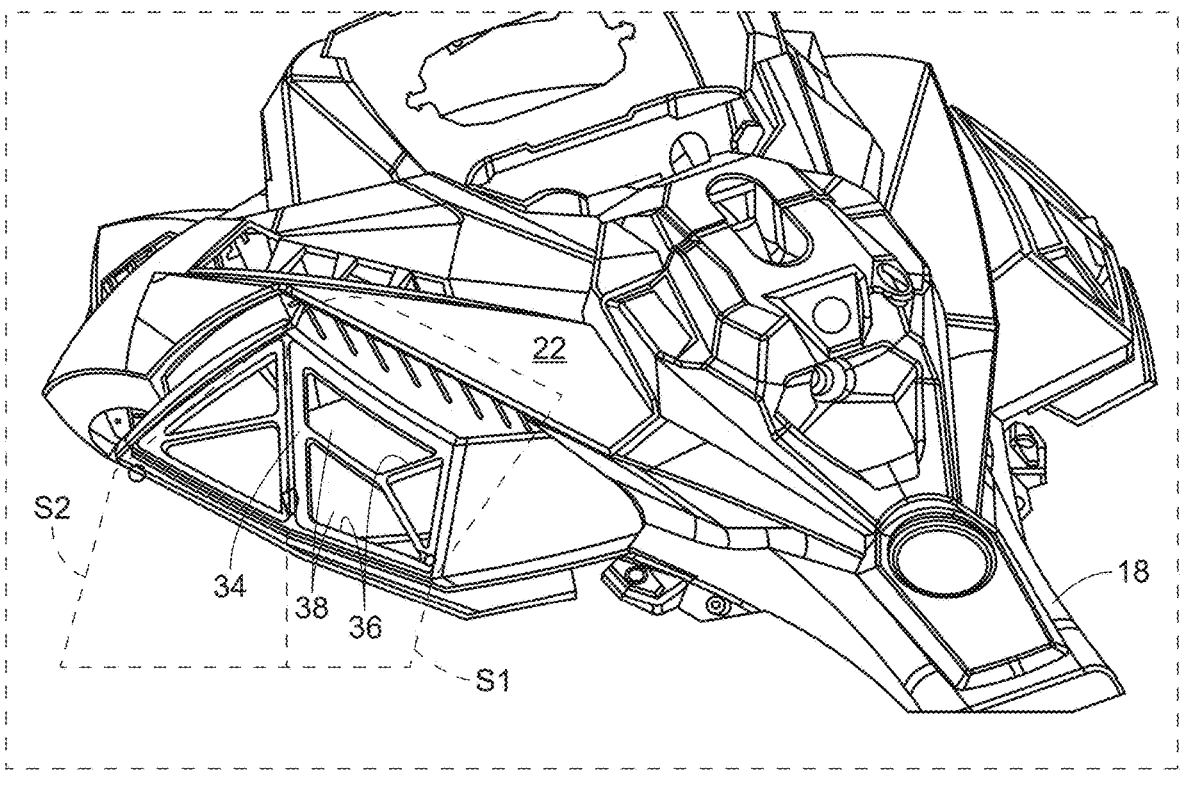
FIGS. 13-15 are views showing continuity of branches of the upper airbox with others of the front-end components in accordance with an embodiment.
Figure 14:
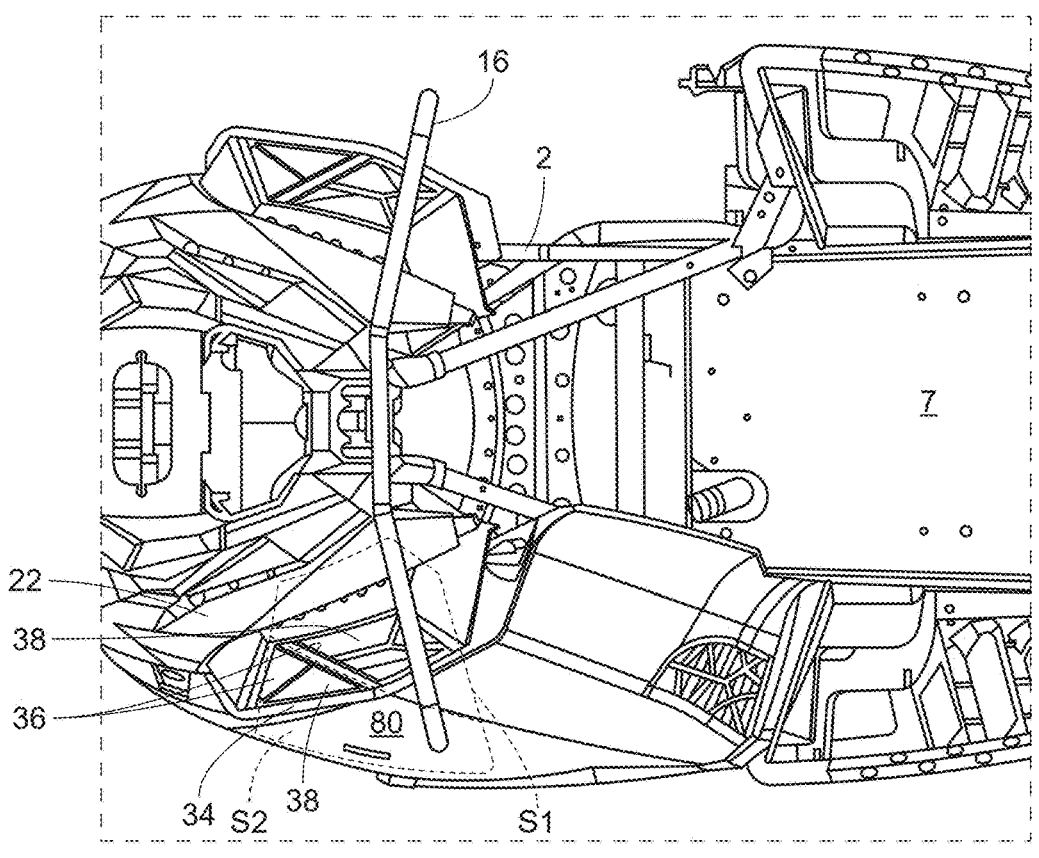
Figure 15:
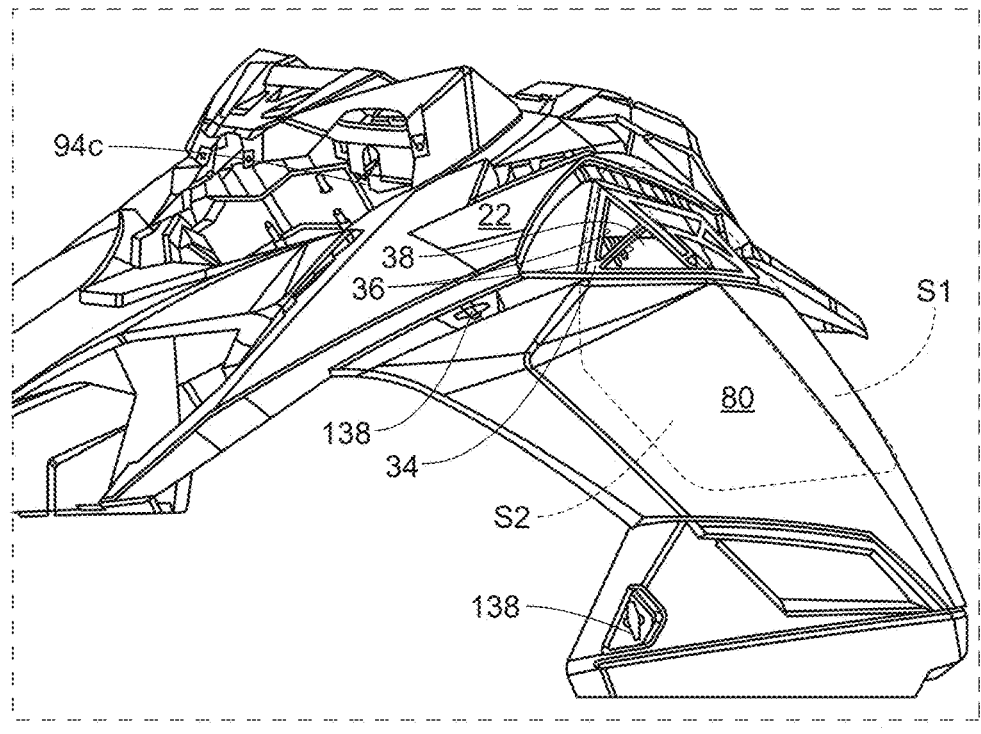

Referring to FIGS. 13, 14, and 15, the outer surfaces 34 of the air intake housings may define a smooth contour in cooperation with one or both of the side members 22 and side panels 80 secured to the snowmobile. For example, the outer surface 34 (including the screens 38) may have one or more facets that each define a smooth surface S1, S2 and a portion of one or both of the side member 22 and side panel 80 may lie on the same one or more surfaces S1, S2. There may be a small (e.g., less than 2 cm) transition region at the edge of each of outer surface 34 and the side member 22 and side panel 80 that does not lie on the surface. The transition region may include bevels and/or chamfers and a gap between the outer surface 34 and the side member 22 and/or between the outer surface 34 and the side panel 80. Each smooth surface S1, S2 may be defined as a surface of constant concavity (no inflection points or, in other words, a second derivative that does not change sign) and a radius of curvature of at least 15 cm, at least 30 cm, or at least 45 cm.

Referring to FIGS. 18-22, the storage box 52 may operate in cooperation with one or more upper body components. The upper body member 20 may define an opening 90 through which a user accesses the internal volume defined by the storage box 52. The underside of the upper body member 20 may be provided with a projection 90a that is received inside or outside of walls of the storage compartment 52 in the lower ring to close off the upper end of the storage compartment 52. For example, the storage box 52 may define a ridge 52c that is offset outwardly from the walls 52d of the storage compartment 52. The projection 90a of the upper body member 20 may then seat within the ridge 52c. A lid 92 (see FIG. 21) may be secured to the opening 90 by means of a press fit, hinge and latch, or other securement means.

Figure 20:
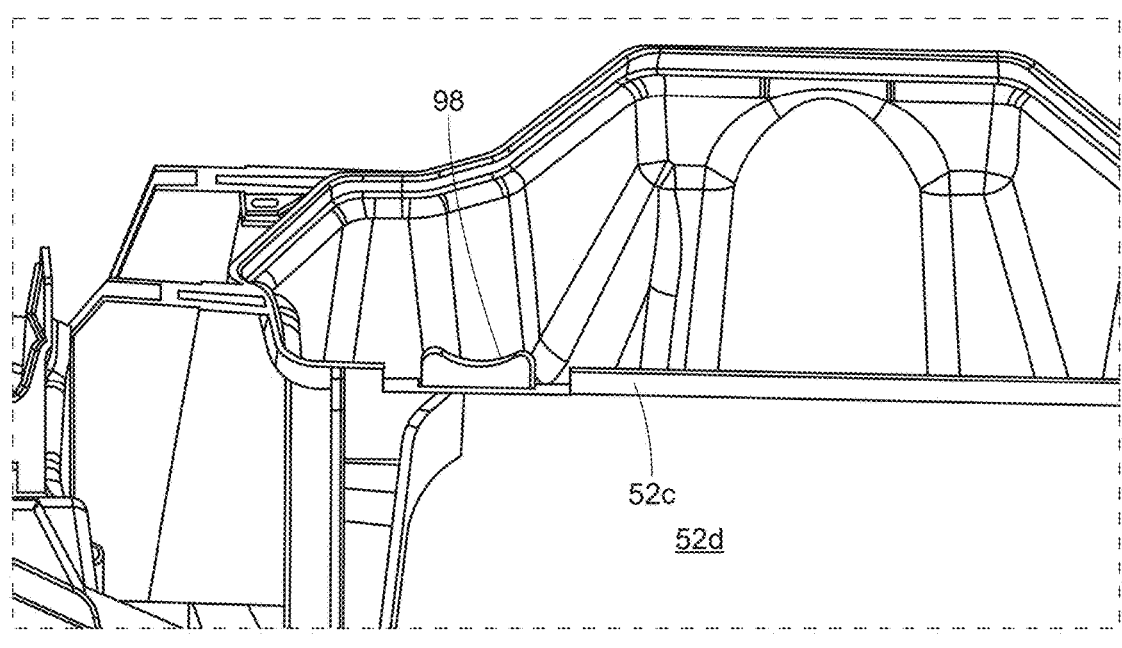
FIG. 20 is an isometric view of structures of the storage box for mounting the outlet in accordance with an embodiment.

The hood projection 90a and/or the storage compartment 52 may define one or more features for receiving an electrical connection. In an illustrative example, one or both of the forward wall 52d of the storage compartment and a forward portion of the hood projection 90a may be provided with the one or more features. The storage box 52 may have an electrical connection including, but not limited to, an outlet 94 accessible from within the storage box 52. For example, the electrical outlet 94 may be a 12V style outlet, USB (any form) outlet, or other type of outlet. The electrical outlet 94 may be positioned or secured between the upper body member 20 and the storage box 52. As for example, the hood projection 90a may define a notch 96 (FIG. 22) and the ridge 52c of the storage box 52 may define a corresponding notch 98 (FIG. 20). The outlet 94 may then be positioned within the notches 96, 98 (FIG. 21) to secure the outlet 94 in the illustrated position that is accessible through the storage box 52.

Figure 21:
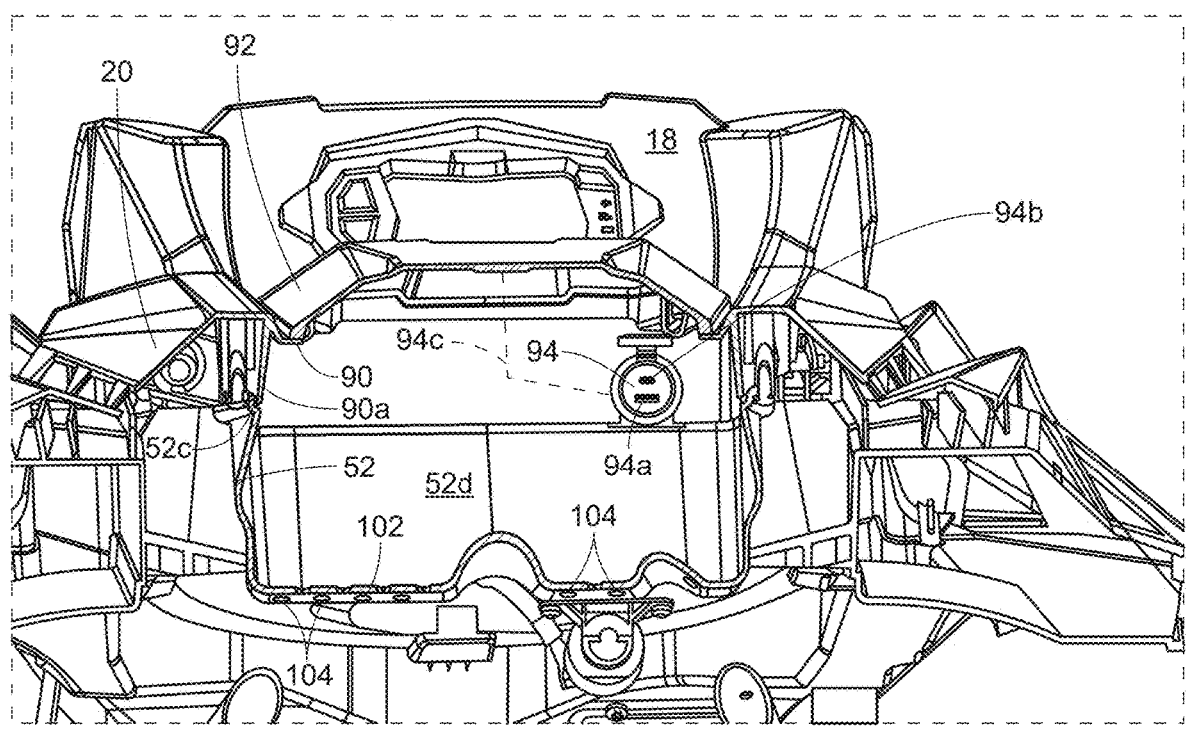
FIG. 21 is a cross-sectional view of the storage box in accordance with an embodiment.
Figure 22:
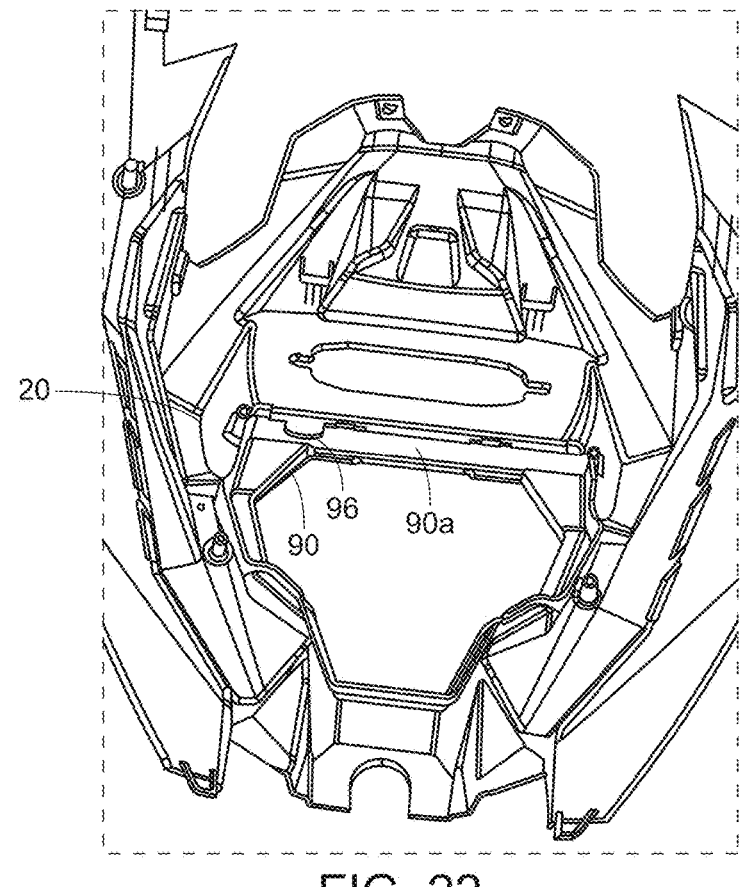
FIG. 22 is an underside isometric view of the hood member showing openings for the storage box and instrument panel.

The outlet 94 may be a data connector, such as a socket for receiving a USB plug or plug according to some other standard. For example, as shown in FIG. 21, the outlet 94 includes a USB 2.0 socket 94a and USB 3.0 form factor socket 94b. The outlet 94 may be coupled by electrical lines 94c to the console 18 (see also FIG. 15). For example, the outlet 94 may be used for uploading data to (e.g., map data, routes, etc.) and downloading data from (engine diagnostic data, GPS tracking data, etc.) the console 18.

The storage box 52 may include perforations 104, e.g., and array of holes, on a lower surface 102 opposite the opening 90. The perforations 104 may function to enable water to drain from the storage box 52 and/or enable heat from the engine to warm items within the storage box 52.

Figure 16:
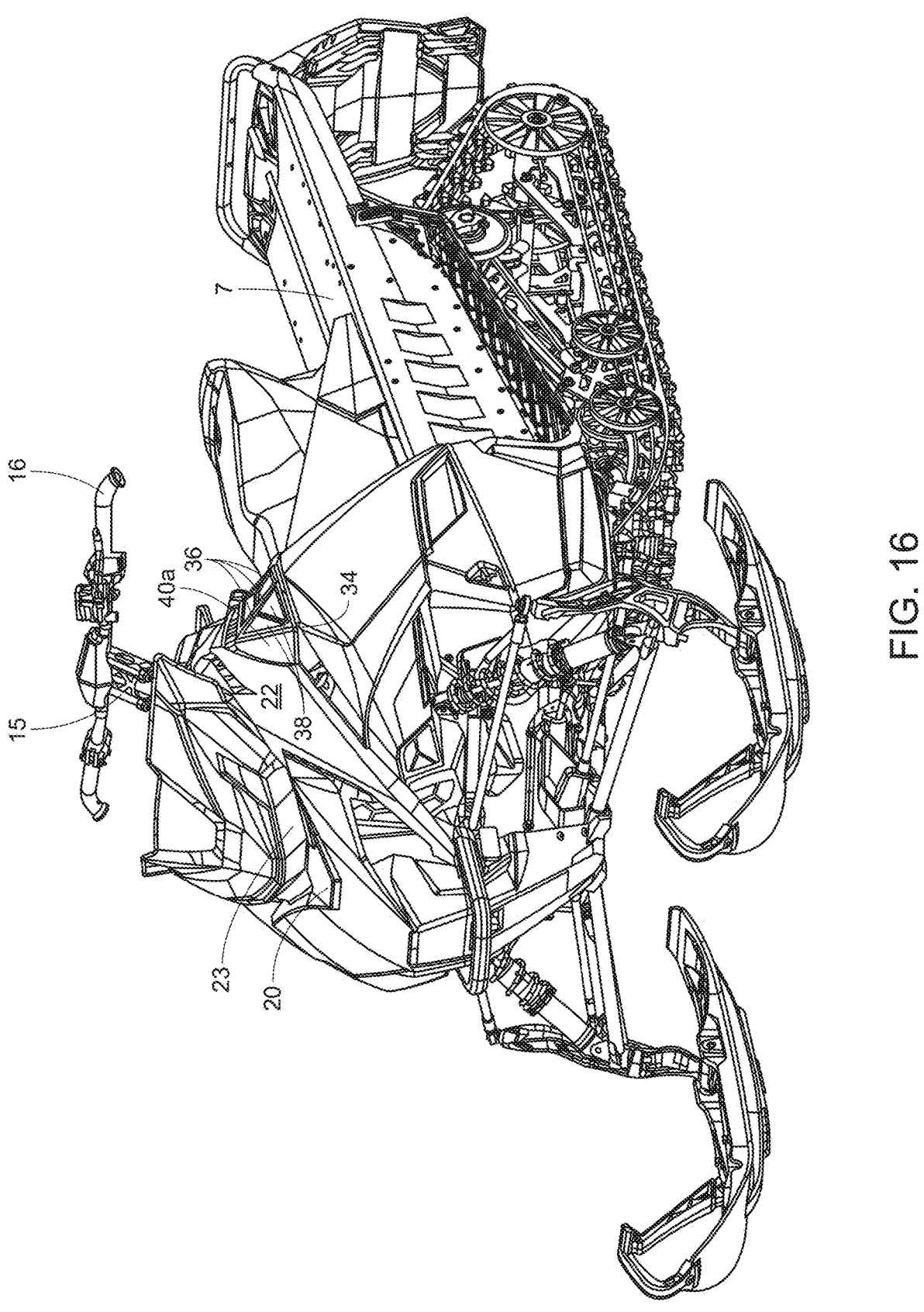
FIG. 16 is an isometric view of the snowmobile including the front-end components in accordance with an embodiment.
Figure 17:
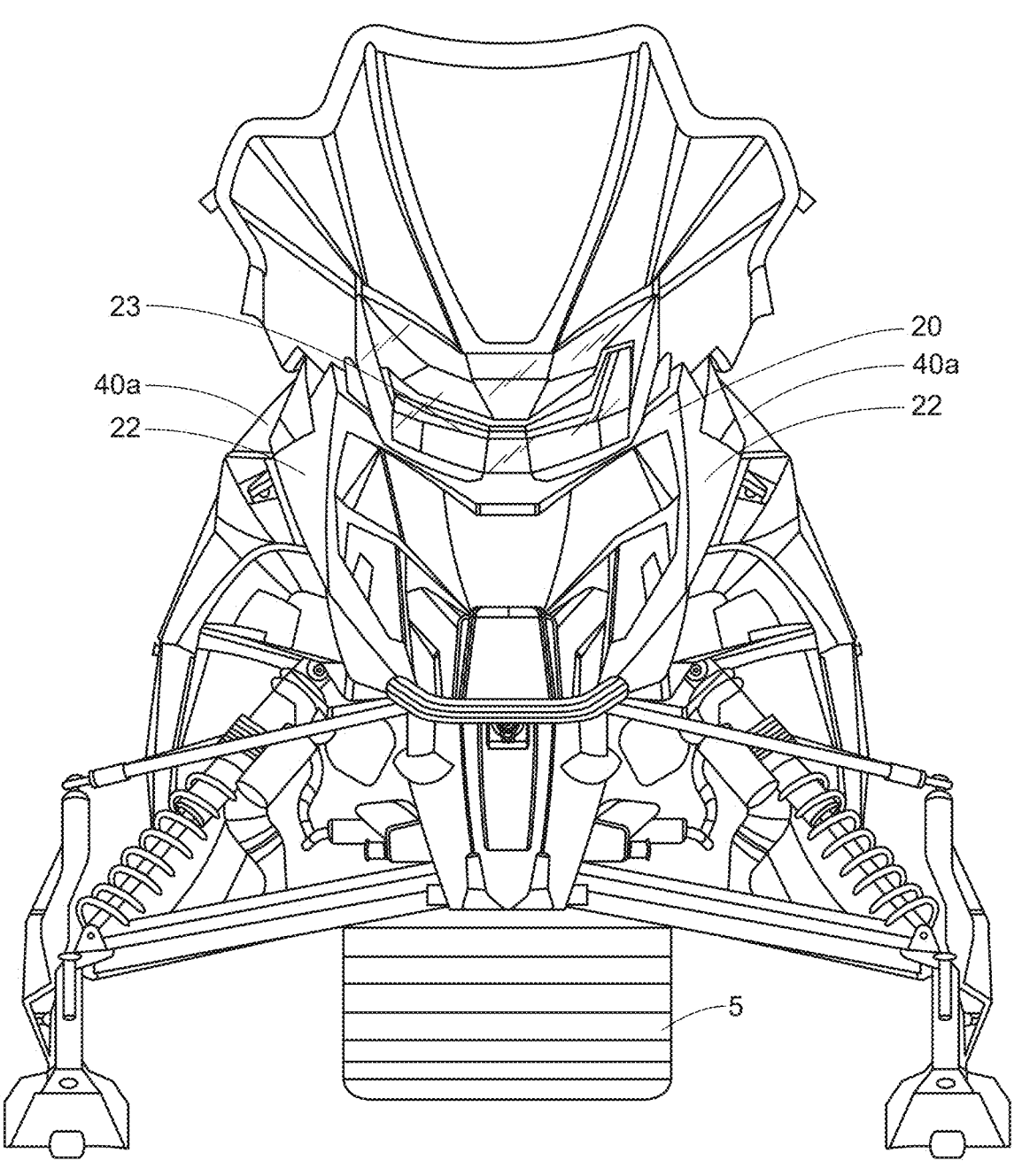
FIG. 17 is a front-elevational view of the snowmobile including the assembly of front-end components in accordance with an embodiment.

Referring specifically to FIGS. 16 and 17, in some embodiments, a headlight assembly 23 is positioned at least partially above a first upper body panel, such as the upper body member 20. The engine air intake opening, e.g., one or more of the openings 36, 42, and 46 may be positioned below at least a portion of the first upper body panel. The first upper body panel may include a first outboard surface, such as the side members 22, extending therefrom, and at least a portion of the engine air intake opening is positioned outboard of the first outboard surface of the upper body panel. In some embodiments, at least a portion of the engine air intake opening is positioned outboard of the entire first upper body panel and may be positioned either partially or entirely outboard of the tunnel 7. The engine air intake opening may be entirely positioned below a headlight of the headlight assembly 23.

As also shown in FIG. 6, a second body panel, such as the upper airbox shell 12, and possibly the upper plenum shell 30, may be positioned at least partially below the first body panel. As described above, the upper airbox shell may define the openings 36, 42, and/or 46 that serve as the engine air intake opening.

Figure 23:
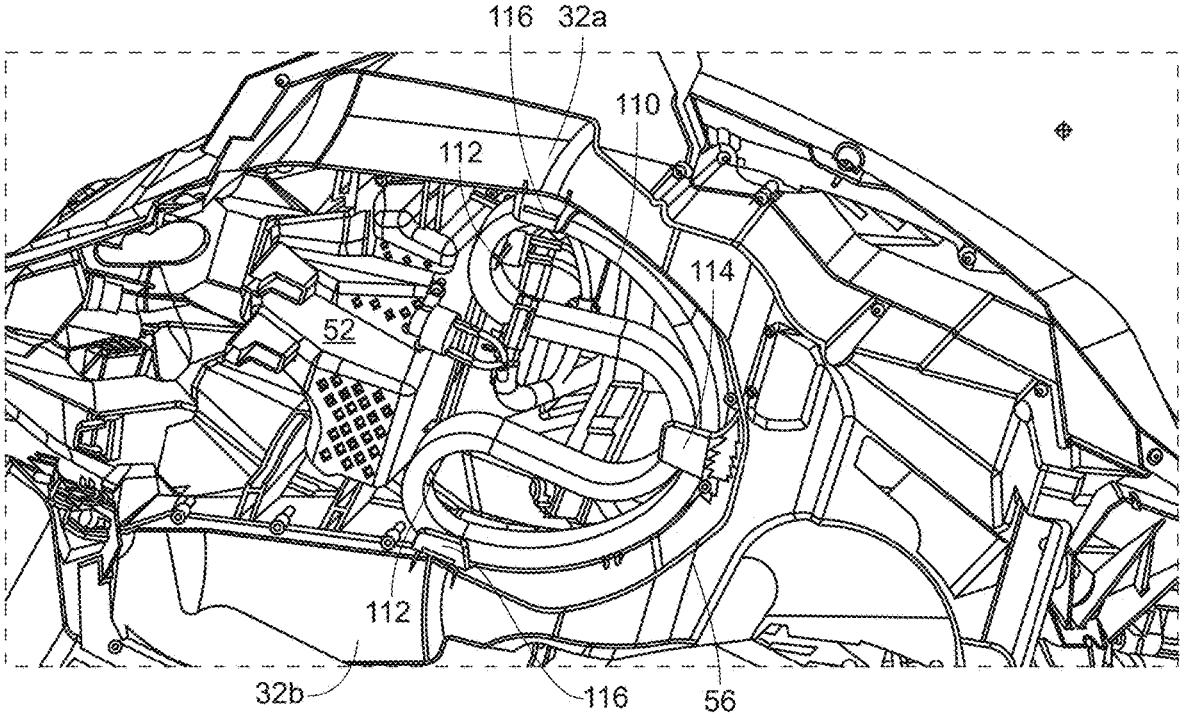
FIG. 23 is an isometric view showing structures for mounting a spare belt in accordance with an embodiment.

Referring to FIG. 23, many snowmobiles use a belt to couple the engine to the track via a continuously variable transmission (CVT). The belt is a wear item that must be replaced periodically. In some embodiments, an item such as spare belt 110 or other spare part (or even a different item desirable to carried by the snowmobile and accessible to the rider) may be storable using the assembly 10. In the illustrated embodiment, an outer surface of the storage box 52 has one or more hooks 112 protruding therefrom. The lower airbox shell 14 further has a hook 114 secured thereto. In the illustrated embodiment, the hook 114 points rearwardly substantially (e.g., within 15 degrees of) along the longitudinal direction 28a whereas the hooks 112 protrude downwardly substantially (e.g., within 15 degrees of) along the vertical direction 28c. One or more additional hooks or platforms 116 may be secured to one or both of the branch shells 58a, 58b of the lower airbox shell 14. The platforms 116 may extend inwardly substantially (e.g., within 15 degrees of) along the transverse direction 28b.

As is apparent, the belt 110 may be looped around the hooks 112, rested on the platforms 116, and slid over the hook 114. The belt 110 has sufficient elasticity to be placed in the illustrated configuration. The belt 110 has sufficient rigidity to remain in the illustrated configuration during operation of the snowmobile until deliberately removed by a user.

Figure 24:
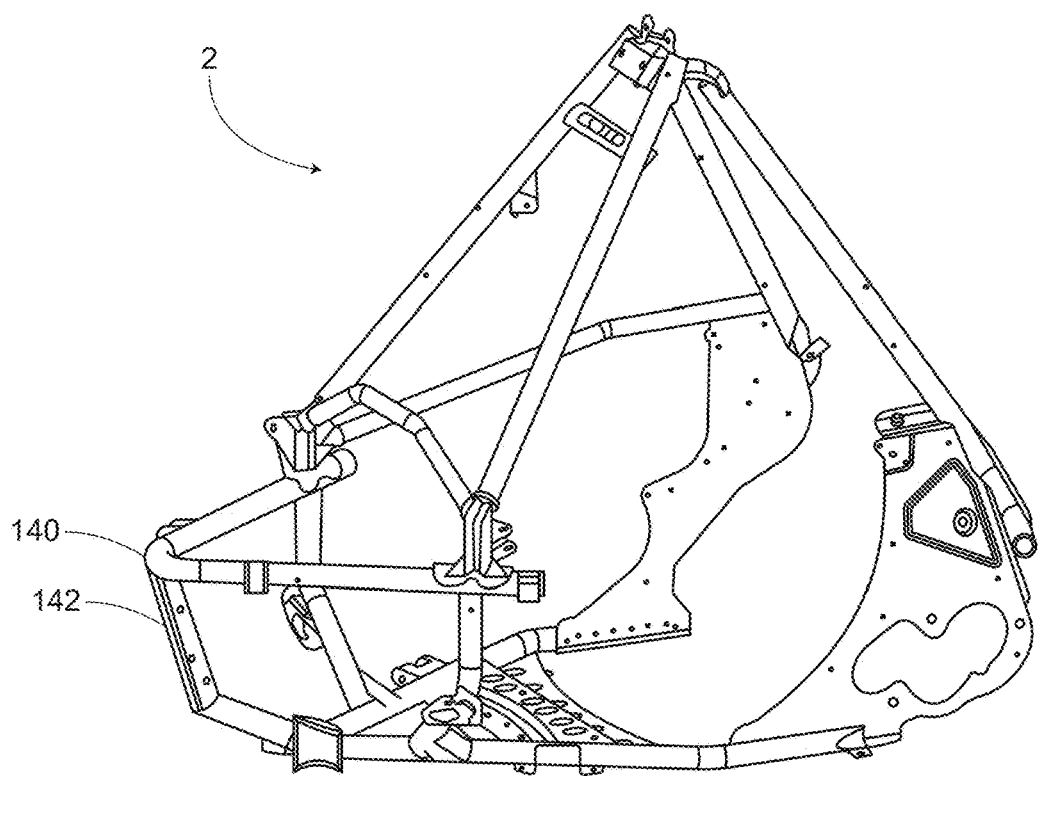
FIG. 24 illustrates an exemplary front frame member of a snowmobile, according to some embodiments.

The hood assembly discussed above, as well as the side panels and other front-end components of the snowmobile are supported by the frame 2. The frame 2 may in addition to, or alternatively, support a front bumper mount and a hood latch. FIG. 24 illustrates the front frame assembly 2 of the snowmobile 1 in accordance with some embodiments of the present disclosure. The front frame assembly forms part of and supports a front of the snowmobile 1 and may include a front/forward frame portion and a removable horizontal member. In at least one embodiment, the forward frame assembly is made of a metal, such as steel, although other metallic or composite materials, such as aluminum may be employed. In at least one embodiment, the front frame 2 may be used for different models/configurations of a snowmobile. In other words, the front frame 2 is a common front frame 2 that may be attached to different types of snowmobiles having different engine packages, different sized tunnels, different suspensions, and different steering mechanisms, for example. The front frame 2, at the front-most part, comprises an upper front member 140 and a lower front member 142. The front frame 2 may be the same as that disclosed in U.S. Provisional Patent Application Ser. No. 63/344,165 filed on May 20, 2022 and entitled "Snowmobile Frame," the contents of which are hereby incorporated herein by reference in their entirety.

Figure 25:
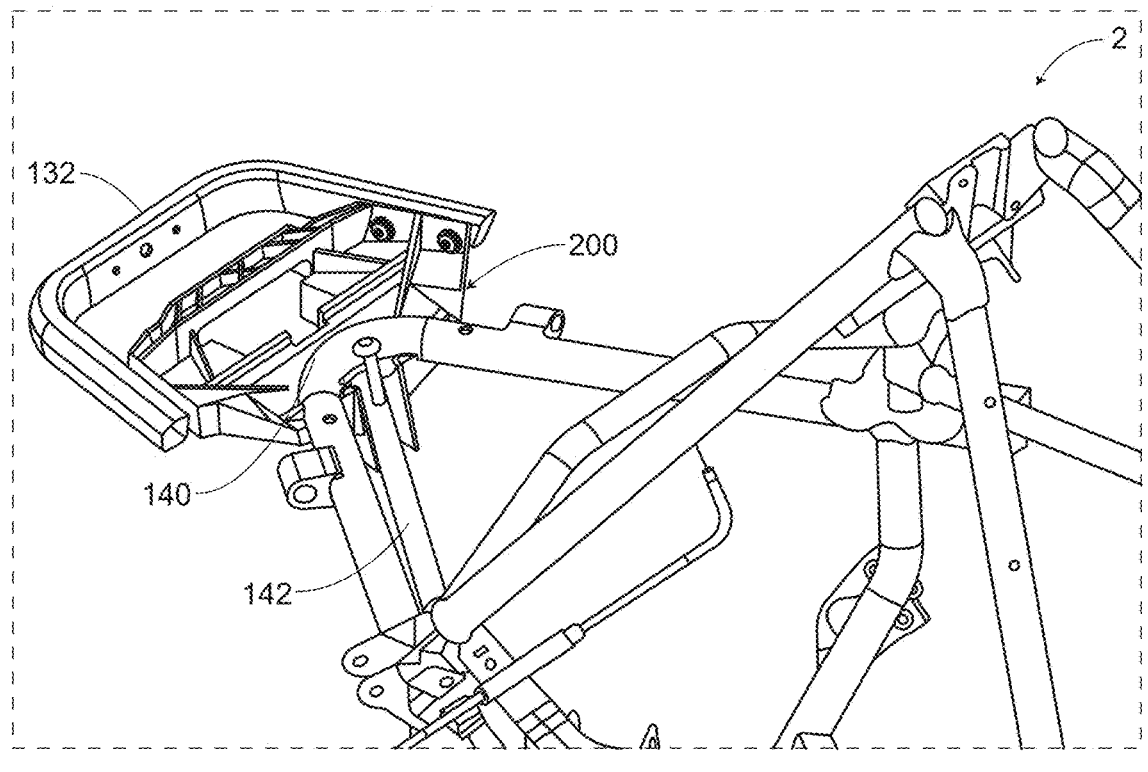
FIG. 25 illustrates exemplary bumper attached to a front frame member with a bumper mount, according to some embodiments.

The present disclosure includes a bumper mount 200 for attaching a bumper to a snowmobile 1. FIG. 25 illustrates an exemplary bumper 132 attached to the front frame 2 of the vehicle. A bumper mount 200 may be coupled to the bumper 132 and may be used to removably attach the bumper 132 to the front frame 2 of the snowmobile. In some embodiments, the bumper mount 200 may be attached to the upper front member 140 and the lower front member 142 of the front frame 2, thereby attaching the bumper 132 to the snowmobile.

FIGS. 26-33 illustrate an exemplary bumper mount 200 for attaching a bumper 132 to a front frame 2 of a snowmobile 1 in accordance with an embodiment of the present disclosure. FIGS. 26 and 27 illustrate an exemplary top perspective view and a bottom perspective view of the bumper mount 200, respectively, in accordance with the present disclosure.

The bumper mount 200 may comprise a front part 202, a rear part 204, a top surface 208, a bottom surface 210, and a perimeter wall 212. The bumper mount 200 may be defined by a length L and a width W. In an embodiment, the length L may be greater as compared to the width W of the bumper mount 200. Optionally, the length may correspond to a distance between two side portions of the perimeter wall 212, and the width may correspond to a distance between a front end of the front part 202 and a rear end of the rear part 204. Accordingly, a lengthwise direction with respect to the bumper mount 200 may be referred as a longitudinal direction B and a widthwise direction with respect to the bumper mount 200 may be referred as a lateral direction A. In other words, the lateral direction A is perpendicular to the longitudinal direction B.

In an exemplary embodiment, the front part 202 may be at the front side of the snowmobile 1. The top surface 208 may be configured to extend between the front part 202 and the rear part 204 on an upper side shown in FIG. 26. The bottom surface 210 is opposite the top surface 208 and may be configured to extend between the front part 202 to the rear part 204 on a lower side as shown in FIG. 27.

The rear part 204 of the bumper mount 200 may comprise a first channel 302. In an embodiment, the first channel 302 may be configured to receive the upper frame member 140 of the frame 2 of a snowmobile 1. For receiving the upper frame member 140, the first channel 302 may be defined by a first curved surface 304 (seen e.g., in FIG. 26) corresponding to the upper frame member 140 of the frame. The first channel 302 may include an outer edge 308 and a plurality of inner edges 314. The outer edge 308 may comprise a first end 310 and a second end 312. The outer edge 308 may further comprise at least one fastening mechanism 306 for secure attachment of the upper frame member 140 of the frame 2 of the snowmobile 1 with the bumper mount 200. In an embodiment, the fastening mechanism 306 may be placed substantially at a center of the outer edge 308. Optionally, the outer edge 308 may comprise two fastening mechanisms 306 placed adjacent to the first end 310 and the second end 312, respectively. In some exemplary embodiments, the at least one fastening mechanism 306 may be a deformable finger extending over the outer edge 308.

The fastening mechanism 306 may be configured to be in a first position (or a resting position) and a second position (or a fitting position) and may further configured to be displaced or slightly elastically deformed from the first position to the second position under influence of an external force. For instance, while attachment with the upper frame member 140 of the frame 2, the fastening mechanism 306 may be applied an external force, for example, a push in a direction from the bottom surface 210 to the top surface 208 of the bumper mount 200. The direction of the external force in such embodiment may be perpendicular or substantially perpendicular to the lateral direction A and the longitudinal direction B. The fastening mechanism 306 may be configured to be displaced from the first position to the second position under influence of the external force, i.e., push force, so as to facilitate reception of the upper frame member 140 in the first channel 302. Once the upper frame member 140 is received in the first channel 302, the fastening mechanism 306 may retain the first position or the resting position. In other words, the upper frame member 140 may be configured to be pushed-in, snapped-in, or popped-in in the first channel 302.

In some embodiments, the rear part 204 of the bumper mount 200 may comprise a second channel 316 (seen e.g., in FIG. 26). The second channel 316 may be configured to receive a lower frame member 142 of the frame 2 (seen e.g., in FIGS. 30 and 31) for attachment of the bumper mount 200 with the frame 2 of the snowmobile 1. Accordingly, the bumper mount 200 may be attached to the frame 2 of the snowmobile 1 at one or both of the upper frame member 140 and the lower frame member 142 of the frame 2.

The second channel 316 may be defined by an extending portion 318 that extends downwardly from the rear part 204 (seen e.g., in FIGS. 26 and 27). The second channel 316 may be configured to be extended to a first length 328 from the top surface 208 at the rear part 204. In some embodiments, the extending portion 318 may be defined by a second curved surface 322 corresponding to the lower front member 142 of the frame. The second curved surface 322 may be defined by an inner surface 324 and an outer surface 326 opposite the inner surface 324. In an embodiment, when the lower frame member 142 is received in the second channel 316, the inner surface 324 abuts the lower frame member 142. In some embodiments, the extending portion 318 may comprise one or more openings 320 (seen e.g., in FIG. 27) at the inner surface 324 and the outer surface 326 of the second curved surface 322 at the first length 328. The one or more openings 320 may be configured to receive at least one first fastener 206 (FIG. 31) therethrough for attaching the lower front member 142 of the frame 2 to the bumper mount 200. The lower frame member 142 may comprise a corresponding opening (not visible) to receive the at least one fastener 206 therethrough for attachment of the bumper mount 200 thereto. The bumper mount 200 may be removed from the front frame 2 by removing the at least one fastener 206 and popping the upper frame member 140 out of the first channel 302.

The perimeter wall 212 (FIGS. 26, 27) may be configured to provide a periphery and/or a boundary to the bumper mount 200. In an embodiment, the perimeter wall 212 may extend from the first end 310 of the first channel 302 of the rear part 204 to a front of the front part 202 of the bumper mount 200, and from the front of the front part 202 of the bumper mount 200 to the second end 312 of the first channel 302 of the rear part 204. In other words, the perimeter wall 212 may include side portions 334 and a front portion 332 (seen e.g., in FIG. 28). In an embodiment, the perimeter wall 212 may comprise one or more holes 330 at the side portions 334 thereof. The one or more holes 330 may be configured to removably couple a bumper 132 to the bumper mount 200 using one or more second fasteners 228 (FIG. 30). Although described herein as separate components, the bumper 132 may be integrally formed with the bumper mount 200.

The top surface 208 and the bottom surface 210 may each include a plurality of ribs extending outwardly. A placement of the plurality of ribs may be configured to increase a strength of the bumper mount 200 and provide energy absorption. In an embodiment, the placement of the ribs is defined based on a load path. Each of the plurality of ribs may be defined by a predefined height and a predefined length. The predefined height and the predefined length may be changed to meet different strength requirements. The plurality of ribs will be explained in detail hereinbelow.

In some embodiments, the bumper mount 200 may further comprise a first intermediate wall 214, and a second intermediate wall 216 (seen e.g., in FIGS. 28 and 29). The first intermediate wall 214 may be at a first predefined distance from the front portion 332 of the perimeter wall 212. In some embodiments, the bumper mount 200 may comprise a first set of ribs 218 (seen e.g., in FIG. 29). The first set of ribs 218 may be extending between the front portion 332 of the perimeter wall 212 and the first intermediate wall 214 on the top surface 208. In some embodiments, the first set of ribs 218 may extend perpendicular or substantially perpendicular to the top surface 208.

The bumper mount 200 may further comprise a second set of ribs 220 extending from the bottom surface 210 (seen e.g., in FIG. 28). In an embodiment, the second set of ribs 220 may extend to the outer surface 326 of the second curved surface 322 of the second channel 316 on the bottom surface 210 of the bumper mount 200. In an embodiment, the second set of ribs 220 may extend from the bottom surface 210 of the front part 202. In another embodiment, the second set of ribs 220 may extend from the bottom surface 210 of the rear part 204. In yet another embodiment, the second set of ribs 220 may extend from the bottom surface 210 of the front part 202 and the rear part 204. In some embodiments, the second set of ribs 220 may extend outwardly in substantially perpendicular or perpendicular from the bottom surface 210. The second set of ribs 220 may including one or more ribs 220 extending from the second channel 316 to each of the side portions 334 of the perimeter wall 212 and the front portion 332 of the perimeter wall 212.

In some embodiments, the bumper mount 200 may further comprise a third set of ribs 222 (seen e.g., in FIG. 29). The third set of ribs 222 may be configured to be extended outwardly from the top surface 208 of the bumper mount 200. In an embodiment, the third set of ribs 222 may extend from the front part 202 of the bumper mount 200. Optionally, the third set of ribs 222 may extend from the rear part 204 of the bumper mount 200.

The bumper mount 200 may further comprise two side sections 224, and a hollow section 226 therebetween (seen e.g., in FIG. 29) that may receive a latch assembly therein.

In an exemplary embodiment, the two side sections 224 and the hollow section 226 may be part of the front part 202 of the bumper mount 200. Each of the two side sections 224 may be of equal size. In other words, a breadth and a length of each of the two side sections 224 may be same. In some embodiments, each of the two side sections 224 may be defined by a first edge 338 and a second edge 340. The first edge 338 of each of the two side sections 224 may be adjacent to the corresponding side portion 334 of the perimeter wall 212 and the second edge 340 at a distance from the first edge 338 in the longitudinal direction B. Each of the second edges 340 may constitute a second wall 342 (seen e.g., in FIG. 27). The second wall 342 may be extended from the top surface 208 towards the bottom surface 210. Such second wall 342 may be formed in the lateral direction A and may be substantially perpendicular to the front portion of the perimeter wall 212. Optionally, each of the two side sections 224 may include at least one rib extending from the top surface 208.

FIGS. 30-32 illustrate an exemplary bumper 132 attached with a bumper mount 200 disclosed in accordance with the present disclosure. For attaching the bumper 132 to a front frame of a snowmobile 1, the bumper mount 200 may be attached to one or both of an upper frame member 140 and a lower frame member 142 of the frame 2 of the snowmobile 1. In an illustrative example, the bumper mount 200 may be attached to the upper frame member 140 and the lower frame member 142 using the first channel 202 and the second channel 204, respectively. In another illustrative example, the bumper mount 200 may be attached to a horizontal frame member and a vertical frame member. Once the bumper mount 200 is secured to the frame 2, the bumper 132 may be attached to the bumper mount 200 using the one or more second fasteners 228. For the same, the bumper 132 may comprise one or more openings (not visible) corresponding to the one or more holes 330 of the perimeter wall for receiving the one or more second fasteners therethrough. The bumper 132 may transfer a load of an external force to the bumper mount 200 during use of the snowmobile or in case of using the bumper to move the snowmobile. The bumper 132 may, for example, be used for lifting the snowmobile 1 from the front, for pushing down a front part of the snowmobile, or moving the snowmobile along a surface, such as by pulling or otherwise towing.

The bumper mount 200 is preferably injection molded with a composite material. It may alternatively be 3D printed or otherwise formed with the various configurations described. Injection molding and 3D printed are two preferred methods in order to achieve the ribs, channels, and recesses described and shown. This way the bumper mount can be manufactured as a single piece or one-piece construction. It can be manufactured with a single composite material, such as a fiber-filled polymer. In some embodiments, a polymer composite includes nylon 6/6, nylon 12, polyetheretherketone (PEEK), polypropylene (PP), polyphthalamide (PPA), or polybutylene terephthalate (PBT) matrix material with glass, carbon, or a ratio of both carbon and glass fiber materials for fiber fill varying in percent volume from 10 to 50, preferably closer to 50%, but at low as 10% or as high as 65%. 35-50% is considered preferable. For example, bumper mount 200 can be manufactured of a molded composite material, such as glass filled long-fiber material.

These materials have the advantages of being tough enough to withstand impacts experienced on the trail while also being flexible enough to pop over the frame member during assembly and be resilient enough to elastically deform rather than yield or yield rather than break at some elevated levels of impact.

In some embodiments, the snowmobile 1 may comprise a front "belly" panel 134 placed in a front portion of the front frame 2 and a front suspension. The front panel 134 may be placed between the bumper 132 and the bumper mount 200 as shown in FIG. 33. The front panel 134 may be configured to work as a forward shield of the snowmobile 1. The front panel 134 may include one or more provisions, such as openings, for receiving the one or more second fasteners 228 (see FIG. 32) for securing the front panel 134 and the bumper 132 with the bumper mount 200. A top front part of the front panel 134 may be designed corresponding to the front portion of the perimeter wall 212 for better attachment of the front panel 134 with the snowmobile 1. A length of the front panel 134 may vary depending upon a type or a model of the snowmobile 1 used.

In some embodiments, the bumper mount 200 may be provided with one or more features for removably securing a vehicle component to the frame 2 of the snowmobile 1. In an embodiment, the bumper mount is provided with a latch assembly for removable securing the vehicle hood thereto. In an illustrative example, the two side sections 224 may be configured to accommodate a latch assembly therewithin (seen e.g., in FIGS. 29, 41, and 42). The latch assembly may be configured to removably secure an upper body component 136 to a frame 2 of a snowmobile 1. The upper body component 136 may include, but is not limited to, a hood, an air plenum, and a storage compartment, all preferably part of the hood assembly described in detail above.

FIGS. 34-37 illustrate an exemplary latch assembly in accordance with the present disclosure. The latch assembly 500 provides for convenient attaching and detaching an upper body component, such as a hood and/or hood assembly, to a frame 2 of a snowmobile 1. The latch assembly 500 may comprise a base 508 (seen e.g., in FIG. 35) defined by an upper surface 612 and a lower surface 620. The base 508 may include a first side section 636, a second side section 638, and a hollow curved structure 626 therebetween defined by a first breadth 628 (seen e.g., in FIG. 36) in the lateral direction A. The upper surface 612 and the lower surface 620 may extend in the longitudinal direction B parallel to the front portion 332 of the perimeter wall 212 of the bumper mount 200 and in the lateral direction A perpendicular to the longitudinal direction B. In some embodiments, the first side section 636 and the second side section 638 may include at least one provision 614 to receive at least one third fastener 512 (seen e.g., in FIG. 35). In some embodiments, any one of the first section 636 and the second section 638 may include at least a first recess or channel 616 in the longitudinal direction B and/or a second recess or channel 618 in the lateral direction A. The first recess 616 and the second recess 618 may be configured to receive a pin 502 of the latch assembly 500 therewithin.

The base 508 may include a first set of side walls 622, and two back walls 624 (seen e.g., in FIG. 37). The first set of side walls 622 may be configured to coincide with at least a portion of the two side sections 224 of the bumper mount 200. In other words, the latch assembly 500 may receive a support from the bumper mount 200 with an arrangement between the first set of side walls 622 of the latch assembly 500 and the side sections 224 of the bumper mount 200. In some embodiments, the two back walls 624 may abut or coincide with the second intermediate wall 216 of the bumper mount 200. Accordingly, the base 508 of the latch assembly 500 may be accommodated within the hollow section 226 of the bumper mount 200.

The latch assembly 500 may include a cover 510 (seen e.g., in FIG. 35). The cover 510 may be defined by a plurality of flaps 630 corresponding to the first side section 636, and the second side section 638 on the upper surface 612 of the base 508. In some embodiments, the plurality of flaps 630 may include at least one hole corresponding to the at least one provision 614 of the base 508 to receive the at least one third fastener 512 and secure the cover 510 to the base 508.

In some embodiments, the cover 510 may include a channel extending through the upper surface 612 to the lower surface 620 of the bumper mount 200 that includes a funnel-shaped provision 634 (seen e.g., in FIGS. 35, 41) between the plurality of flaps 630. The funnel-shaped provision 634 may be configured to accommodate a stud 144 or a latch of an upper body component 136 (seen e.g., in FIGS. 44-47) therewithin. In some embodiments, for attaching a front end of the upper body component 136 to the frame 2, the stud 144 may be placed at the funnel-shaped provision 634. A shape of the funnel-shaped provision 634 may be substantially corresponding to the stud 144 so that the stud 144 may get fit into the funnel-shaped provision 634. In other words, the shape of the funnel-shaped provision 634 provides a path/a direction to the stud 144 for getting attached to the frame from the front end.

For attaching the upper body component 136 (e.g., hood 20) to the frame 2 at a front end, the stud 144 may be placed in the funnel-shaped provision 634 and is positioned in the channel. The stud 144 may comprise a groove G (seen e.g., in FIG. 44) corresponding to the pin 502 of the latch assembly 500. Hence, when the stud 144 is placed at the funnel-shaped provision 634, the pin 502 of the latch assembly 500 engages with the groove G of the stud 144 (seen e.g., in FIG. 47). Such engagement restricts movement of the upper body component 136 with respect to the frame 2 of the vehicle at the front end.

Similarly, for detaching the upper body component 136, the stud 144 is released from the funnel-shaped provision 634. In some embodiments, the pin 502 may be displaced to release the stud 144 from the latch assembly 500. The releasing of the stud 144 is explained hereinbelow in detail. Hence, attachment and detachment of the upper body component 136 with the snowmobile 1 may be accomplished without tools in accordance with the present disclosure.

The latch assembly 500 may further comprise an actuator 504 (seen e.g., in FIG. 36). The actuator 504 may be defined by a front end 602, and a rear end 604. The rear end 604 may further be defined by an upper curve 606 and a lower curve 608. In some embodiments, the hollow curved structure 626 of the base 508 may be configured to accommodate the lower curve 608 of the actuator 504 (seen e.g., in FIGS. 34-37, 41). In some embodiments, the second intermediate wall 216 may comprise an actuator engaging portion 336 to accommodate the upper curve 606 of the actuator 504 at the rear end 604 (seen e.g., in FIG. 38). Accordingly, the actuator 504 is engaged at the rear end between the actuator engaging portion 336 of the bumper mount 200 and the hollow curved structure 626 of the base 508 of the latch assembly 500.

In some embodiments, a pawl 506 may extend from the upper curve 606 adjacent to the rear end 604 of the actuator 504 (seen e.g., in FIGS. 35 and 37). In an embodiment, the pawl 506 may extend to a third length 610 from the upper curve 606 of the actuator 504. In an embodiment, at least a portion of the pawl 506 may be placed adjacent to at least a portion of the pin 502 when the pin 502 is received in the first recess 616 and/or the second recess 618 of the base 508 of the latch assembly 500.

Figure 46:
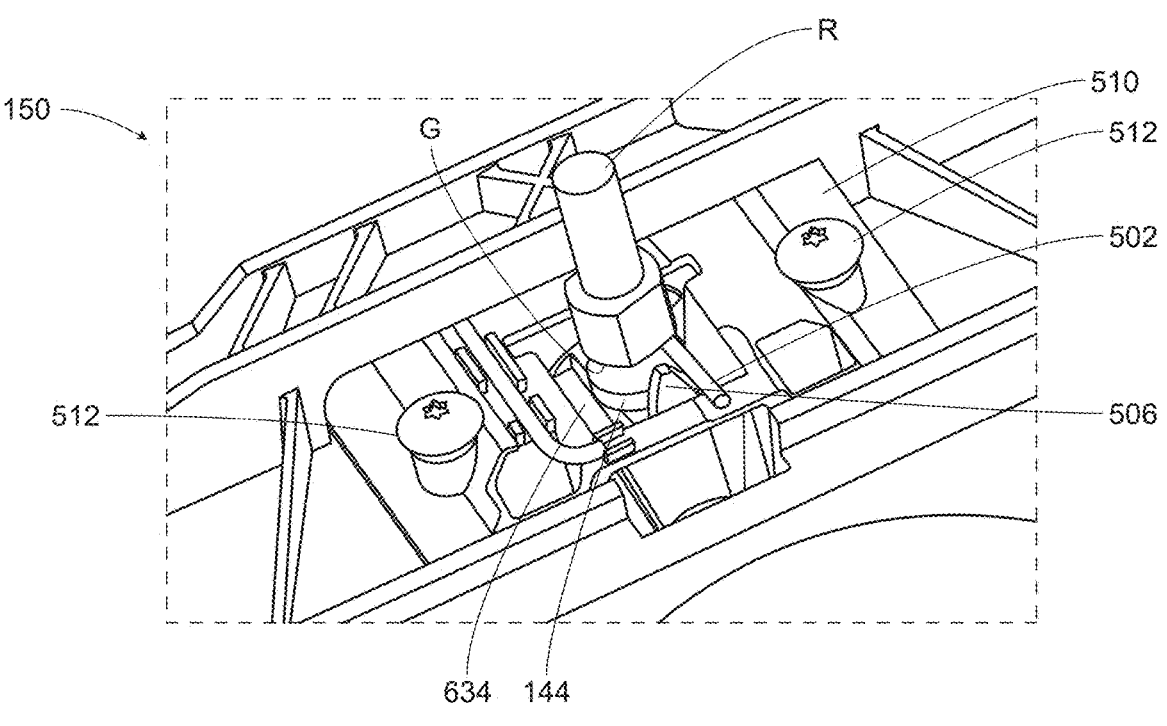

The actuator 504 may be configured to be rotated to a certain degree for releasing the stud 144. The rotation of the actuator 504 may result in displacement of the pawl 506 from a first position to a second position. On displacement of the pawl 506, the pin 502, which is adjacent to the at least a portion of the pawl 506 as shown in FIG. 46, may be displaced. The displacement of the free end of the pin 502 away from the stud 144 while the opposite end of the pin 502 is retained in the first recess 616 and/or the second recess 618 of the base 508 results in release of the pin 502 from the groove of the stud 144, thereby resulting in releasing of the stud 144, and hence, the upper body component 136 from the front end of the frame 2. Consequently, the displacement of the pawl 506 may facilitate releasing of the stud 144 from the latch assembly 500. In some embodiments, the pawl 506 may be configured to be in the second position after displacement. Optionally, the pawl 506 may be configured to retain the first position after displacement to the second position.

In some embodiments, the actuator 504 may be configured to be rotated in a clockwise direction to the certain degrees for releasing the stud 144. Optionally, the actuator 504 may be configured to be rotated in an anticlockwise direction to the certain degrees for releasing the stud 144. In an embodiment, the actuator 504 may be configured to be rotated between 10-15 degrees. In a preferred embodiment, the actuator 504 may be rotated for 13.5 degrees in the anticlockwise direction for releasing the stud 144.

Optionally, the latch assembly 500 may include a knob 538 (seen e.g., in FIGS. 39-40) for rotation of the actuator 504. In some embodiments, the knob 538 may be attached to the front end 602 of the actuator 504 through a knob provision P in the front panel 134 (seen e.g., in FIG. 40). As shown in FIG. 39, one or more stops may be provided on one or more of the front panel 134, the latch assembly 500, and the bumper mount 200 for preventing the knob 538 from being rotated more than necessary to disengage the stud 144 from the bumper mount assembly 150.

The present disclosure further discloses a bumper mount assembly 150 (seen e.g., in FIGS. 41-43). The bumper mount assembly 150 may be configured to be coupled with a frame 2 of a snowmobile 1. A bumper 132 may be attached to the bumper mount assembly 150.

The bumper mount assembly 150 may include the bumper mount 200 and the latch assembly 500 as disclosed hereinabove. Accordingly, the bumper mount assembly 150 includes above mentioned features of the bumper mount 200 and the latch assembly 500. For instance, the bumper mount assembly 150 may include a bumper mount 200 comprising a front part 202, a rear part 204, a top surface 208, and a bottom surface 210 extending between the front part 202 and the rear part 204, and a perimeter wall 212 partially surrounding the bumper mount 200. The front part 202 may comprise a hollow section 226 for receiving the latch assembly 500 therewithin. The rear part 204 may comprise a first channel 302 on the top surface 208 corresponding to an upper frame member 140 of a frame 2 of a snowmobile 1, and a second channel 316 corresponding to a lower frame member 142 of the frame 2 of the snowmobile 1. The first channel 302 may comprise at least one retaining or fastening mechanism 306 for receiving the upper frame member 140 therewithin. The second channel 316 may comprise one or more openings 320 for attaching the lower frame member 142 of the frame 2 of the snowmobile 1 using one or more first fasteners 206. The perimeter wall 212 may comprise one or more holes 330 on side portions 334 of the perimeter wall 212 for attaching a bumper 132 using one or more second fasteners 228.

The latch assembly 500 may include a pin 502, an actuator 504, a pawl 506, a base 508, and a cover 510. The latch assembly 500 may be configured to attach a front of an upper body component 136 of the snowmobile 1 with the frame 2 of the vehicle body. The pin 502 may be configured to be engaged with a stud 144 of the upper body component 136 for attachment of the upper body component 136. The actuator 504, with the pawl 506, may be displaced for releasing the pin 502 from the stud 144, thereby detaching the upper body component 136 from the frame 2 of the snowmobile 1.

In some embodiments, the stud 144 may be attached with the upper body component 136 using a threaded rod R and a jam nut N (seen e.g., in FIGS. 44-46). The threaded rod R may facilitate a gap of different distances between the upper body component 136 and the bumper mount 200. Hence, a suitable gap may be kept between the upper body component 136 and the bumper mount assembly 150 to have a desired air intake.

Referring to FIGS. 47-49, an upper body component 136 attached to a snowmobile 1 is shown. As explained hereinabove, the upper body component 136 includes one or more retaining features, such as feet 52a, that are positioned at a rearward end of the upper body component 136. The retaining features may be positioned on a portion of the front frame 2 such as the cross-member 2a (FIGS. 8-9) (or upper frame support 138 as described in U.S. Provisional Patent Application Ser. No. 63/344,165) extending between upper frame members near the steering column mount positioned at the top of the front frame 2. The front end of the upper body component includes a stud 144 that when lowered with the retaining features positioned on the front frame 2 may be attached to the latch assembly 500. Accordingly, hooking the retaining features (feet 52a) over the rearward facing side of the cross-member 2a while the stud 144 is engaged with the latch assembly secures the upper body component 136 to the front frame 2 with the need for tools. The upper body component 136 may comprise at least one notch (not shown) at a rear end. The rear end of the upper body component 136 may be referred to as the end which is attached to a console member (not shown) of the snowmobile. The console member may further be shaped to receive at least a portion of a steering column 15 of the snowmobile 1. In some embodiments, the console member may include at least one notch receiver (not shown) corresponding to the at least one notch of the hood. An attachment V of the at least notch and the at least one notch receiver is shown in FIG. 48. Once the hood is attached to the console member from the notch, a quarter turn fastener Q (seen e.g., in FIG. 49) may be used for secure attachment of the upper body component 136 with side members of the frame 2. Optionally, a strap fastener may be used for securing the upper body component 136 with the side members.

Once the hood is secured with the console member and the feet 52a are positioned on the cross-member 2a, the front end of the upper body component 136 may be displaced downwardly for engagement with the latch assembly 500. Accordingly, the stud 144, present at the front end of the upper body component 136, may be displaced so as to be received in the funnel-shaped provision 634 of the latch assembly 500. As a result, the upper body component 136 is attached to the frame 2 of the snowmobile 1 using the latch assembly 500 and the feet 52a that hook over the rearward-facing side of the cross-member 2a. Hence, the attachment of the upper body component 136 in the snowmobile 1 may be accomplished. There is no requirement of additional tools for fastening and releasing different parts of the upper body component 136 for attachment with the snowmobile 1.

The bumper mount 200 and/or the bumper mount assembly 150 may be made using a mold. The mold may be an open-shut mold. The mold may comprise an upper sub-mold and a lower sub-mold. In other words, a manufacturing of the bumper mount 200 is a single step process in which the upper-sub mold and the lower-sub mold may be shut while preparing the bumper mount, and the upper-sub mold and the lower-sub mold may be opened while a structure of the bumper mount in accordance with the mold is formed. Hence, the process of manufacturing the bumper mount is very easy and quick.

In some embodiments, a composite material used for making the bumper mount may include a fiber reinforced material and polymer matrix constituents. In an embodiment, the whole bumper mount assembly 150 may be made of the composite material. Optionally, a part of the bumper mount assembly 150 may be made of the composite material. For instance, the bumper mount 200 and the pawl 506 of the latch assembly 500 may be made of the composite material. In some embodiments, the fiber reinforced material is glass filled nylon. Optionally, the reinforced material may be glass fiber reinforced material, carbon fiber reinforced material, or both. Use of such composite material makes the bumper mount and the bumper mount assembly lightweight.

The bumper mount 200 may be made by a specific molding process. Some non-limiting examples of the molding process are casting, injection molding, compression molding, and the like. In a preferred embodiment, injection molding may be used to make the bumper mount 200. Because of the injection molding process, the fiber of the material follows a direction of the mold along the ribs. Hence, more effective tensile strength is achieved by the bumper mount 200. Such method makes the bumper mount cost-effective.

In some embodiments, the tensile strength of the composite material is optionally 240-280 MPa, optionally 250-270 MPa, and optionally 255-265 MPa. An exemplary flexural strength is 330-370 MPa, 340-360 MPa, and optionally 345-355 MPa. An exemplary flexural modulus is 14,600-15,000 MPa, optionally 14,700-14,900 MPa, and optionally 14,750-14,850 MPa. Further, a specific gravity of the material is 1.57. Moreover, a fiber density of the glass fiber material is 20-60% by volume material fill of long glass fiber reinforcement, optionally 30-60% by volume material fill of long glass fiber reinforcement, optionally 40-60% by volume material fill of long glass fiber reinforcement, and optionally 45-55% by volume material fill of long glass. Although described herein as including long glass fibers, it is to be understood that other fibers and other fiber lengths may be substituted or mixed with the long glass fibers at same ranges of loading levels described above. Because of use of such material, the bumper mount and/or the bumper mount assembly of the present disclosure may be configured to deform and to regain an original shape. In another embodiment, the bumper mount and/or the bumper mount assembly may be configured to completely fail in the presence of a force to inhibit transferring the force to the frame of the vehicle body. Hence, the bumper mount and/or the bumper mount assembly may work as a fusible link.

It is to be noted that different values and parameters mentioned in the description are exemplary in nature and are not intended to bound the specification in any manner. It is further to be noted that the present disclosure has been described with respect to a snowmobile, however, the present disclosure may be applicable to other different types of powersports vehicles as well.

Finally, while the present disclosure has been described above with reference to various exemplary embodiments, many changes, combinations, and modifications may be made to the exemplary embodiments without departing from the scope of the present disclosure. For example, the various components may be implemented in alternative ways. These alternatives can be suitably selected depending upon the particular application or in consideration of any number of factors associated with the operation of the device. In addition, the techniques described herein may be extended or modified for use with other types of devices. These and other changes or modifications are intended to be included within the scope of the present disclosure.

The embodiments of the invention in which an exclusive property or privilege is claimed are defined as follows:

1. A bumper mount for attaching a bumper to a frame of a tracked vehicle, the bumper mount comprising:
   a front part comprising a hollow section;
   a rear part including a first channel for receiving an upper front member of the frame, and a second channel for receiving a lower front member of the frame;
   a perimeter wall at least partially surrounding the front part and the rear part, the perimeter wall configured to facilitate attaching the bumper;
   wherein the hollow section is configured to receive a latch assembly therewithin, the latch assembly comprising:
      a base;
      a pin supported by the base and configured to releasably engage a stud of an upper body component of the tracked vehicle;
      an actuator rotatably supported by the base and operatively coupled to the pin; and
      a knob coupled to the actuator and configured to be turned to rotate the actuator and thereby displace the pin to release the stud.

2. The bumper mount of claim 1, wherein the front part, the rear part, a top surface extending from the front part to the rear part on an upper side, a bottom surface extending from the front part to the rear part on a lower side opposite to the top surface, and the perimeter wall are uniformly formed.

3. The bumper mount of claim 2, wherein the tracked vehicle has a longitudinal axis, the bumper mount comprising a first intermediate wall transverse to the longitudinal axis and extending to the perimeter wall and a second intermediate wall extending transverse to the longitudinal axis between the first intermediate wall and the first channel.

4. The bumper mount of claim 3, comprising a first set of ribs extending between a front portion of the perimeter wall and the first intermediate wall on the top surface.

5. The bumper mount of claim 4, comprising a second set of ribs on the bottom surface extending from any one of the front part, the rear part, and combination thereof.

6. The bumper mount of claim 3, comprising two side sections between the first intermediate wall and the second intermediate wall, each of the side sections being defined by a first edge adjacent to a side portion of the perimeter wall and a second edge at a distance to the first edge, the second side edge of the two side sections defining the hollow section therewithin.

7. The bumper mount of claim 6, wherein the latch assembly comprises a pawl, and a cover, the pawl positioned adjacent to at least a portion of the pin, the pawl configured to displace the pin upon rotation of the actuator.

8. The bumper mount of claim 7, wherein the actuator is defined by a front end and a rear end, the actuator being in connection with the pawl adjacent to the rear end.

9. The bumper mount of claim 8, wherein the second intermediate wall comprises an actuator engaging portion to accommodate an upper curve of the actuator at the rear end.

10. The bumper mount of claim 1, wherein the first channel is defined by a first curved surface corresponding to the upper front member of the frame forward of an engine air box, the first channel including an outer edge having a first end and a second end, and a plurality of inner edges for receiving the upper front member of the frame on both a front and rear face of the upper front member of the frame.

11. The bumper mount of claim 10, wherein the outer edge of the first curved surface includes at least one fastening mechanism adjacent to the first end and the second end for securing the upper front member of the frame in the first channel.

12. The bumper mount of claim 11, wherein the fastening mechanism is a deformable finger extending over the outer edge.

13. The bumper mount of claim 1, wherein the second channel is defined by a downwardly extending portion from the rear part, the second channel intersecting the first channel at an upper end of the second channel.

14. The bumper mount of claim 13, wherein the extending portion is defined by a second surface corresponding to the lower front member of the frame, the second surface is defined by an inner surface abutting the lower front member of the frame along at least two opposite sides thereof and an outer surface opposite the inner surface; the second channel being configured to be extended to a first length from a top surface at the rear part.

15. The bumper mount of claim 14, wherein the extending portion comprises one or more openings at the inner surface and the outer surface of the second surface at the first length to receive at least one first fastener therethrough for attaching the lower front member of the frame to the bumper mount.

16. The bumper mount of claim 1, comprising one or more holes on side portions of the perimeter wall to couple the bumper using one or more second fasteners.

17. The bumper mount of claim 1, manufactured by three-dimensional printing.

18. The bumper mount of claim 1, manufactured by injection molding a long-fiber plastic composite.

19. A method of making a bumper mount for a tracked vehicle having a longitudinal axis, a transverse axis, and a vertical axis, a forward portion of the tracked vehicle having a frame and a bumper, the method comprising:

forming a first, generally transverse, channel for engagement with a generally transverse tracked vehicle frame member, the first channel closely engaging at least two sides of the transverse tracked vehicle snowmobile frame member;

forming a second, generally vertical, channel for engagement with a generally vertical tracked vehicle frame member, the second channel closely engaging at least two sides of the generally vertical tracked vehicle frame member; and forming a ribbed structural region for extending between the channels and the bumper;

forming a space within the bumper mount for a latch assembly, the latch assembly comprising:

a base;

a pin supported by the base and configured to releasably engage a stud of an upper body component of the tracked vehicle;

an actuator rotatably supported by the base and operatively coupled to the pin; and a knob coupled to the actuator and configured to be turned to rotate the actuator and thereby displace the pin to release the stud.

20. The method of claim 19, the latch assembly further comprising a cover, and the method further comprising receiving a stud of an upper body component of the tracked vehicle into a funnel-shaped provision of the cover such that the stud is guided into a channel of the latch assmebly.

21. The method of claim 19, further comprising engaging the pin with a groove of the stud to retain the upper body component relative to the frame.

22. The method of claim 19, wherein the actuator is rotated between about 10 degrees and about 15 degrees by turning the knob, and wherein one or more stop features limit rotation of the knob to prevent rotation beyond that used to disengage the stud.

23. A bumper mount assembly for attaching a bumper to a forward- most portion of a frame of a tracked vehicle, the frame extending forward of all front suspension mounts, the bumper mount assembly comprising:

a bumper mount comprising:

a front part comprising a hollow section, wherein the hollow section is configured to receive a latch assembly, the latch assembly comprising:

a base defined by an upper surface and a lower surface and including a first side section, a second side section, and a hollow curved structure therebetween;

a cover secured to the base, the cover defining a channel configured to receive a stud of an upper body component that is attachable to the frame of the tracked vehicle using the latch assembly;

a pin configured to be received in at least one recess on the upper surface of the base, the pin configured to engage a groove of the stud when the stud is received in the channel;

an actuator having a front end and a rear end, the rear end including an upper curve and a lower curve, the lower curve being accommodated by the hollow curved structure;

a pawl extending from the upper curve of the actuator adjacent to the rear end and positioned to displace the pin upon rotation of the actuator; and a knob coupled to the front end of the actuator, the knob being configured to be turned to rotate the actuator from a first position to a second position to displace the pawl and thereby displace the pin to release the stud;

a rear part;

a top surface;

a bottom surface extending between the front part and the rear part; and a perimeter wall partially surrounding the bumper mount.

24. The bumper mount assembly of claim 23, the cover comprising a plurality of flaps corresponding to at least a portion of the first side section and the second side section and a funnel-shaped provision between the plurality of flaps.

25. The bumper mount assembly of claim 23, wherein the bumper mount comprises a first intermediate wall extending transverse to a longitudinal axis of the tracked vehicle from one portion of the perimeter wall to an opposite portion of the perimeter wall, a second intermediate wall, and two side sections therebetween, the hollow section being defined between the first intermediate wall, the second intermediate wall, and the two side sections.

26. The bumper mount assembly of claim 25, wherein the bumper mount comprises a first set of ribs extending between a front portion of the perimeter wall and the first intermediate wall on the top surface, the first set of ribs extending outwardly from the top surface.

27. The bumper mount assembly of claim 23, wherein the bumper mount is formed of a long-fiber composite material.

* * * * *